(12) United States Patent
Clowes et al.

(10) Patent No.: US 12,421,693 B2
(45) Date of Patent: Sep. 23, 2025

(54) WORKING MACHINE

(71) Applicant: J.C. BAMFORD EXCAVATORS LIMITED, Uttoxeter (GB)

(72) Inventors: Matthew James Clowes, Uttoxeter (GB); Neil Beloe, Uttoxeter (GB); Alex Kay, Uttoxeter (GB)

(73) Assignee: J.C. BAMFORD EXCAVATORS LIMITED, Uttoxeter (GB)

( * ) Notice: Subject to any disclaimer, the term of this patent is extended or adjusted under 35 U.S.C. 154(b) by 943 days.

(21) Appl. No.: 16/937,559

(22) Filed: Jul. 23, 2020

(65) Prior Publication Data

US 2021/0023907 A1    Jan. 28, 2021

(30) Foreign Application Priority Data

Jul. 23, 2019  (GB) ........................ 1910496
Mar. 31, 2020 (GB) ........................ 2004772

(51) Int. Cl.
*E02F 9/22*   (2006.01)
*B60H 1/00*   (2006.01)
(Continued)

(52) U.S. Cl.
CPC ......... *E02F 9/226* (2013.01); *B60H 1/00378* (2013.01); *B60H 1/00392* (2013.01); *B60H 1/03* (2013.01); *B60H 1/22* (2013.01); *E02F 9/207* (2013.01); *E02F 9/2075* (2013.01); *F15B 21/0423* (2019.01); *F15B 21/0427* (2019.01);
(Continued)

(58) Field of Classification Search
CPC ..... B60L 1/003; B60L 50/60; B60H 1/00007; B60H 1/00278; B60H 1/00378; B60H 1/0075; B60H 1/2218; B60H 1/2221; B60H 1/3227; B60H 1/00392; B60H 1/03; B60H 1/22; E02F 9/2095; E02F 9/2278; E02F 9/207; E02F 9/2075; E02F 9/226; F15B 21/0423; F15B 21/0427; F15B 21/04; B60Y 2200/41; Y02T 10/70
See application file for complete search history.

(56) References Cited

U.S. PATENT DOCUMENTS 4,069,972 A  *  1/1978  Hausmann ......... B60H 1/00378
                                              184/104.2
4,192,456 A  *  3/1980  Shields .................... B60H 1/22
                                              237/12.3 A
(Continued)

FOREIGN PATENT DOCUMENTS

CN       205895776 U      1/2017
CN       106480921 A      3/2017
(Continued)

OTHER PUBLICATIONS

Search Report for GB 2004772.6, dated Apr. 30, 2020.
(Continued)

*Primary Examiner* — Dustin T Nguyen
(74) *Attorney, Agent, or Firm* — MARSHALL, GERSTEIN & BORUN LLP

(57) ABSTRACT

A working machine having a thermal management system with an energy distribution system to selectively transfer thermal energy between an operator structure and a hydraulic fluid, based on the relative values of an operator structure energy requirement and a hydraulic fluid energy requirement.

17 Claims, 10 Drawing Sheets

(51) Int. Cl.
  *B60H 1/03* (2006.01)
  *B60H 1/22* (2006.01)
  *E02F 9/20* (2006.01)
  *F15B 21/0423* (2019.01)
  *F15B 21/0427* (2019.01)
  *F15B 21/04* (2019.01)

(52) U.S. Cl.
  CPC ........... *B60Y 2200/41* (2013.01); *F15B 21/04* (2013.01); *Y02T 10/70* (2013.01)

(56) References Cited

U.S. PATENT DOCUMENTS

| | | | | |
|---|---|---|---|---|
| 4,346,839 | A | * | 8/1982 | Moser .................... B60H 1/22 122/26 |
| 4,352,456 | A | * | 10/1982 | Brandenburg, Jr. ..... B60H 1/03 122/26 |
| 5,954,266 | A | * | 9/1999 | Hoshino .................. B60H 1/14 122/26 |
| 7,478,671 | B2 | * | 1/2009 | Ikeda ....................... B60H 1/14 165/296 |
| 2003/0050150 | A1 | | 3/2003 | Tanaka et al. |
| 2018/0320338 | A1 | | 11/2018 | Osaka et al. |
| 2022/0134843 | A1 | * | 5/2022 | Andreuccetti ....... B60H 1/2221 62/239 |
| 2024/0278673 | A1 | * | 8/2024 | Twigger ............... H01M 10/486 |

FOREIGN PATENT DOCUMENTS

| | | | |
|---|---|---|---|
| DE | 2774789 | * 9/2014 | ......... B60H 1/00378 |
| DE | 102014112632 A1 | 3/2016 | |
| DE | 10 2014 119463 A1 | 6/2016 | |
| EP | 2774789 A1 | 9/2014 | |
| JP | 2008236871 A | 10/2008 | |
| JP | 2009274462 A | 11/2009 | |
| JP | 5462731 B2 | 4/2014 | |

OTHER PUBLICATIONS

Search Report for GB 1910496.7, dated Apr. 29, 2020.
Extended European Search Report for European Patent Application No. 20186804.9, dated Jan. 11, 2021.
Extended European Search Report for European Patent Application No. 20186805.6, dated Jan. 12, 2021.
Extended European Search Report for EP 10186804.9, dated Apr. 4, 2023.

* cited by examiner

WORKING MACHINE

FIELD

The present disclosure relates to a working machine, a method for transferring thermal energy around a working machine, and to a thermal management system.

BACKGROUND

Working machines of various types such as excavators, backhoe loaders, wheel loading shovels, telescopic handlers, tractors, material handling and the like used in various applications in construction, agriculture, logistics and waste handling and recycling have historically been powered by internal combustion engines (ICEs), for example diesel engines.

Due to increasing concerns regarding climate change and air quality, legislation has been enacted that is resulting in a drive towards alternative power sources for such machines. One such power source is electrical energy stored in batteries or other storage media that is used to provide energy to electric motors to operate such working machines. The batteries may be used as the sole source of power to the machine, or may be used in conjunction with an ICE in a so called "hybrid" configuration whereby power may be supplied from the battery to the electric motors alone, energy may be supplied from diesel fuel to power an internal combustion engine alone, or some combination of the two power sources may be utilized. In such hybrid configurations, typically a smaller ICE will be provided than on a traditional machine with the power shortfall being supplied from the batteries and electric motor.

Traditional energy sources such as diesel fuel have a greater energy density than batteries, i.e. one unit mass of the fuel is able to supply more energy compared to a unit mass of a battery. Diesel fuel is generally lower cost than batteries or other electrical energy storage media. Batteries also take significantly longer to charge than an ICE engine takes to refuel, potentially leading to a loss of productivity.

In addition, ICEs produce a significant amount of waste heat in operation that may be utilized for heating parts of the working machine as required, such as the operator structure. Such a source of heat may be reduced in a hybrid working machine, or be entirely non-existent in a solely electrically powered working machine.

During certain stages of a typical operating cycle of a working machine, and being dependent upon environmental conditions, certain parts of a working machine may desirably be heated or cooled to maintain operating efficiency and operator comfort. The supply of energy to effect such heating or cooling may be problematic in certain circumstances in a pure electric working machine or a hybrid working machine in view of the reduced availability or quality of energy and waste heat to provide such heating or cooling. In particular the use of electrical energy from the machine's batteries to provide such heating or cooling may reduce the available energy for such a machine to perform working operations, between periods of charging where the machine may not be operable, thereby compromising the working efficiency of the machine.

The present teachings seek to overcome or at least mitigate the problems of the prior art.

SUMMARY

According to a first aspect, there is provided a working machine comprising: a hydraulic fluid circuit arranged to provide hydraulic fluid to one or more hydraulic actuators to perform a working operation; an operator structure; an operator structure climate control assembly arranged to selectively add and/or remove thermal energy to/from the operator structure for selectively warming and cooling the operator structure; a heat exchanger arranged to selectively add and/or remove thermal energy from the hydraulic fluid circuit for selectively warming and cooling the hydraulic fluid; and a thermal management system connecting the heat exchanger to the operator structure climate control assembly, wherein the thermal management system is configured to determine an operator structure energy requirement based on a target operator structure temperature and a hydraulic fluid energy requirement based on a target hydraulic fluid temperature, and wherein the thermal management system comprises an energy distribution system to selectively transfer thermal energy between the operator structure and the hydraulic fluid based on the relative values of the operator structure energy requirement and the hydraulic fluid energy requirement.

Advantageously, this arrangement enables excess thermal energy in the hydraulic fluid to be used to heat the operator structure and/or vice versa, and therefore increases the efficiency of the working machine. Using an energy requirement calculation for the operator structure and the hydraulic fluid as opposed to absolute temperature values is advantageous in determining the amount and the rate of heat transfer required between the hydraulic fluid and the operator structure.

The provision of an energy distribution system allows heat transfer to occur more efficiently in certain conditions, for example when thermal energy is transferred from an operator structure that is cooler than the hydraulic fluid, but the operator structure has an energy surplus and the hydraulic fluid has an energy deficit.

The energy distribution system of the thermal management system may be configured to activate when the working machine is in an active state.

The working machine is considered to be in an active state when it is turned on, e.g. before or during use by an operator, and when it is charging. The provision of an energy distribution system that operates when the machine is active enables said system to preheat the operator structure and/or hydraulic fluid prior to use by an operator.

When the working machine is in an active state, i.e. when the working machine is turned on or is charging, this arrangement helps pre heat the hydraulic fluid and/or operator structure. This helps to ensure that the hydraulic fluid is operating at an optimal viscosity to increase the efficiency of the working operations and/or to improve user comfort within the operator structure. Providing a thermal management system that will supply heat when the machine is in an active state (i.e. when the machine is either running or charging) ensures that the additional supplied energy does not have to come from an electrical energy storage device.

The thermal management system may be configured to heat the hydraulic fluid and/or operator structure to the respective target temperature(s) prior to or at an expected time of operation of the working machine, i.e. an expected start time of the working machine.

This arrangement provides a time, e.g. input by an operator, by which the hydraulic fluid and/or operator structure should be heated by. This enables the hydraulic fluid and/or operator structure to be heated just in time for use by an operator, which avoids the system maintaining the target temperatures unnecessarily. This helps to improve the efficiency of the thermal management system.

The expected time of operation may be inputted by an operator.

The thermal management system may be configured to calculate the expected time of operation of the working machine from a mean value of times at which the working machine is turned on over a pre-determined period of time.

Incorporating machine learning may improve the efficiency of the thermal management system because thermal energy is not wasted maintaining the hydraulic fluid and operator structure at their target temperatures.

The thermal management system may be configured to activate such that the time at which the hydraulic fluid and/or operator structure are preheated to their respective target temperatures is approximately equal to the expected time of operation.

This arrangement helps to ensure that the operator structure and hydraulic fluid of the working machine are only preheated for the desired time, which avoids waste energy being used by holding the operator structure and hydraulic fluid at their target temperatures during a whole charging cycle.

The energy distribution system may be configured to impart thermal energy into the thermal management system when transferring thermal energy between the operator structure and the hydraulic fluid. The thermal management system may be configured to transfer this imparted energy to hydraulic fluid and/or operator structure.

Utilization of the energy put into the thermal management system by the energy distribution system to heat the operator structure and/or hydraulic fluid has been found to improve the efficiency of the thermal management system, and so of the working machine.

The thermal management system may be configured to determine whether the working machine has an energy surplus or an energy deficit based on the operator structure energy requirement and the hydraulic fluid energy requirement.

Calculation of whether the working machine has an energy surplus or an energy deficit (i.e. calculation of the energy requirement of the working machine) allows the thermal management system to determine whether there is a need to add or remove thermal energy from the working machine, depending on whether there is an energy deficit or an energy surplus within the working machine. This has been found to improve the efficiency of the system, and so of the working machine.

The thermal management system may be configured to determine whether the working machine has an energy surplus or an energy deficit based on the thermal energy imparted into the thermal management system when transferring thermal energy between the operator structure and the hydraulic fluid.

Incorporating the energy supplied by energy distribution system into the machine energy requirement calculation improves the accuracy of the energy requirement calculation. This has been found to improve the efficiency of the thermal management system, and so of the working machine.

When the working machine is determined to have an energy surplus, the thermal management system may be configured to selectively remove thermal energy from the hydraulic fluid and/or the operator structure and to direct the surplus thermal energy to ambient or to transfer the surplus thermal energy to a component of the working machine, e.g. to transfer the surplus thermal energy to an electric energy storage device, an electric heater and/or an electric motor for providing, at least in part, tractive power to the working machine.

This arrangement may further optimize the usage of thermal energy in the working machine.

The energy distribution system may comprise a heat pump circuit. The heat pump circuit or refrigerant circuit may include a compressor for compressing a refrigerant in the heat pump circuit and optionally including an expansion device, an evaporator and a condenser.

This arrangement enables the energy transfer system to selectively transfer heat from a source to a target, even when the source temperature is below the required temperature of the target.

The energy distribution system may be configured to determine whether the working machine has an energy surplus or an energy deficit based on the energy added to the refrigerant by the compressor.

This has been found to increase the accuracy of the energy requirement calculation.

The energy distribution system may comprise a coolant circuit having a coolant flow path in thermal communication with the operator structure and the hydraulic fluid for transferring thermal energy therebetween, optionally wherein the coolant flow path is in thermal communication with the hydraulic fluid heat exchanger and the operator structure climate control assembly.

The coolant circuit may comprise a coolant pump for circulating coolant around the coolant flow path.

The energy distribution system may be configured to determine whether the working machine has an energy surplus or an energy deficit based on thermal energy in the coolant. The energy distribution system may be configured to determine whether the working machine has an energy surplus or an energy deficit based on the volume and/or specific heat capacity of the coolant.

The electric heater may be configured to impart thermal energy into the coolant, e.g. when the working machine is charging.

The thermal energy in the hydraulic fluid and/or the coolant may be used to pre-heat the operator structure.

The working machine may comprise an electric heater arranged to supply thermal energy to the thermal management system. The electric heater may enable the thermal management system to pre-heat the hydraulic fluid and/or the operator structure.

This arrangement may enable the pre-conditioning of the hydraulic fluid and/or operator structure to occur prior to operation of the working machine. Additionally, this may allow thermal energy to be added to the energy distribution system when there is insufficient thermal energy to heat the hydraulic fluid and/or the operator structure.

The working machine may comprise an outside heat exchanger configured to liberate thermal energy from the atmosphere and/or to supply thermal energy to the thermal management system.

This has been found to improve the efficiency of the thermal management system, and so of the working machine.

The thermal management system may be configured to determine the operator structure energy requirement based on a measured operator structure temperature and a target operator structure temperature and/or to determine the hydraulic fluid energy requirement based on a measured hydraulic temperature and a target hydraulic fluid temperature.

Inputting the measured value for hydraulic fluid temperature may improve the efficiency of heat transfer if the operator structure is above or below the target temperature. Additionally, using a measured value increases the accuracy of the hydraulic fluid energy requirement.

The thermal management may be configured to determine the operator structure energy requirement and/or hydraulic fluid energy requirement based on a measured ambient temperature.

Inputting the ambient temperature into the energy requirement calculation tells the thermal management system if there is thermal energy available to be absorbed from ambient. Additionally, the accuracy of the operator structure energy requirement may increase because if the ambient temperature is lower than the measured operator structure temperature, the rate of thermal energy transferred to ambient is accounted for.

The thermal management system may be configured to determine the operator structure energy requirement based on a solar load imparted onto the operator structure.

Inputting the solar load may improve the efficiency of the system because it inhibits energy being extracted unnecessarily, for example to heat the operator structure, when energy is available from the solar load.

The operator structure operator structure climate control assembly may comprise an operator structure heat exchanger configured to selectively add thermal energy to the operator structure and/or an operator structure cooler configured to selectively remove thermal energy from the operator structure.

The working machine may further comprise an electrical energy storage device configured to provide, electrical energy to an electric motor to provide, at least in part, tractive power to the ground engaging propulsion structure and/or power to a hydraulic pump to provide pressurized hydraulic fluid to displace the or each hydraulic actuator.

The thermal management system may be arranged to supply thermal energy to and/or remove thermal energy from at least one of: an electric motor to provide tractive power to the ground engaging structure, an electric motor to drive a hydraulic pump of the hydraulic fluid circuit, power electronics of the working machine; and the electrical energy storage device.

This arrangement may further optimize the usage of thermal energy in the working machine.

According to a second aspect, there is provided a method for transferring thermal energy around a working machine using a thermal management system, the method comprising the steps of:
a) determining an operator structure energy requirement based on a target operator structure temperature;
b) determining a hydraulic fluid energy requirement based on a target hydraulic fluid temperature;
c) calculating a working machine energy requirement based on the operator structure energy requirement and the hydraulic fluid energy requirement; and
d) selectively transferring thermal energy between the operator structure and the hydraulic fluid based on the operator structure energy requirement and the hydraulic fluid energy requirement.

This method helps ensure that the hydraulic fluid is operating at an optimal viscosity to increase the efficiency of the working operations and thereby maximize the operations that may be undertaken between recharging operations of the electrical energy storage device. Additionally, the overall efficiency of the working machine is further improved since less electrical energy is used to effect operator structure heating.

The method may further comprise the step of determining whether a working machine has an energy surplus or an energy deficit based on the operator structure energy requirement and the hydraulic fluid energy requirement.

The method may be carried out only when the working machine is in an active state.

According to a third aspect, there is provided a thermal management system for a working machine of the type having a hydraulic fluid circuit arranged to provide hydraulic fluid to one or more hydraulic actuators to perform a working operation, an operator structure, an operator structure climate control assembly arranged to selectively add and/or remove thermal energy to/from the operator structure for selectively warming and cooling the operator structure, and a heat exchanger arranged to selectively add and/or remove thermal energy from the hydraulic fluid circuit, the thermal management system comprising: an energy distribution system to selectively transfer thermal energy between the operator structure and the hydraulic fluid, wherein the thermal management system is configured to determine an operator structure energy requirement based on a target operator structure temperature and a hydraulic fluid energy requirement based on a target hydraulic fluid temperature, and wherein the energy distribution system is configured to selectively transfer thermal energy between the operator structure and the hydraulic fluid based on the relative values of the operator structure energy requirement and the hydraulic fluid energy requirement.

According to a fourth aspect, there is provided a working machine comprising: a hydraulic fluid circuit arranged to provide hydraulic fluid to one or more hydraulic actuators to perform a working operation; an operator structure; an operator structure climate control assembly arranged to selectively add and/or remove thermal energy to/from the operator structure for selectively warming and cooling the operator structure; a heat exchanger arranged to selectively add and/or remove thermal energy from the hydraulic fluid circuit for selectively warming and cooling the hydraulic fluid; and a thermal management system connecting the heat exchanger to the operator structure climate control assembly, wherein the thermal management system is configured to preheat the hydraulic fluid and/or operator structure to respective target temperature(s) prior to or at an expected time of operation of the working machine.

This arrangement provides a start time, e.g. input by an operator, by which the hydraulic fluid and/or operator structure should be heated by. This enables the hydraulic fluid and/or operator structure to be heated just in time for use by an operator, which avoids the system maintaining the target temperatures unnecessarily. This helps to improve the efficiency of the thermal management system.

The expected time of operation may be inputted by an operator.

The thermal management system may be configured to calculate the expected time of operation of the working machine from a mean value of times at which the working machine is turned on over a pre-determined period of time.

Incorporating machine learning may improve the efficiency of the thermal management system because thermal energy is not wasted maintaining the hydraulic fluid and operator structure at their target temperatures.

The thermal management system may be configured to activate such that the time at which the hydraulic fluid and/or operator structure are preheated to their respective target temperatures is approximately equal to the expected time of operation.

This arrangement helps to ensure that the operator structure and hydraulic fluid of the working machine are only preheated for the desired time, which avoids waste energy being used by holding the operator structure and hydraulic fluid at their target temperatures during a whole charging cycle.

It will be appreciated that the fourth aspect may also comprise one or more of the features of the first aspect.

BRIEF DESCRIPTION OF THE DRAWINGS

Embodiments disclosed herein will now be described, by way of example only, with reference to the accompanying drawings, in which.

DETAILED DESCRIPTION

Figure 1:
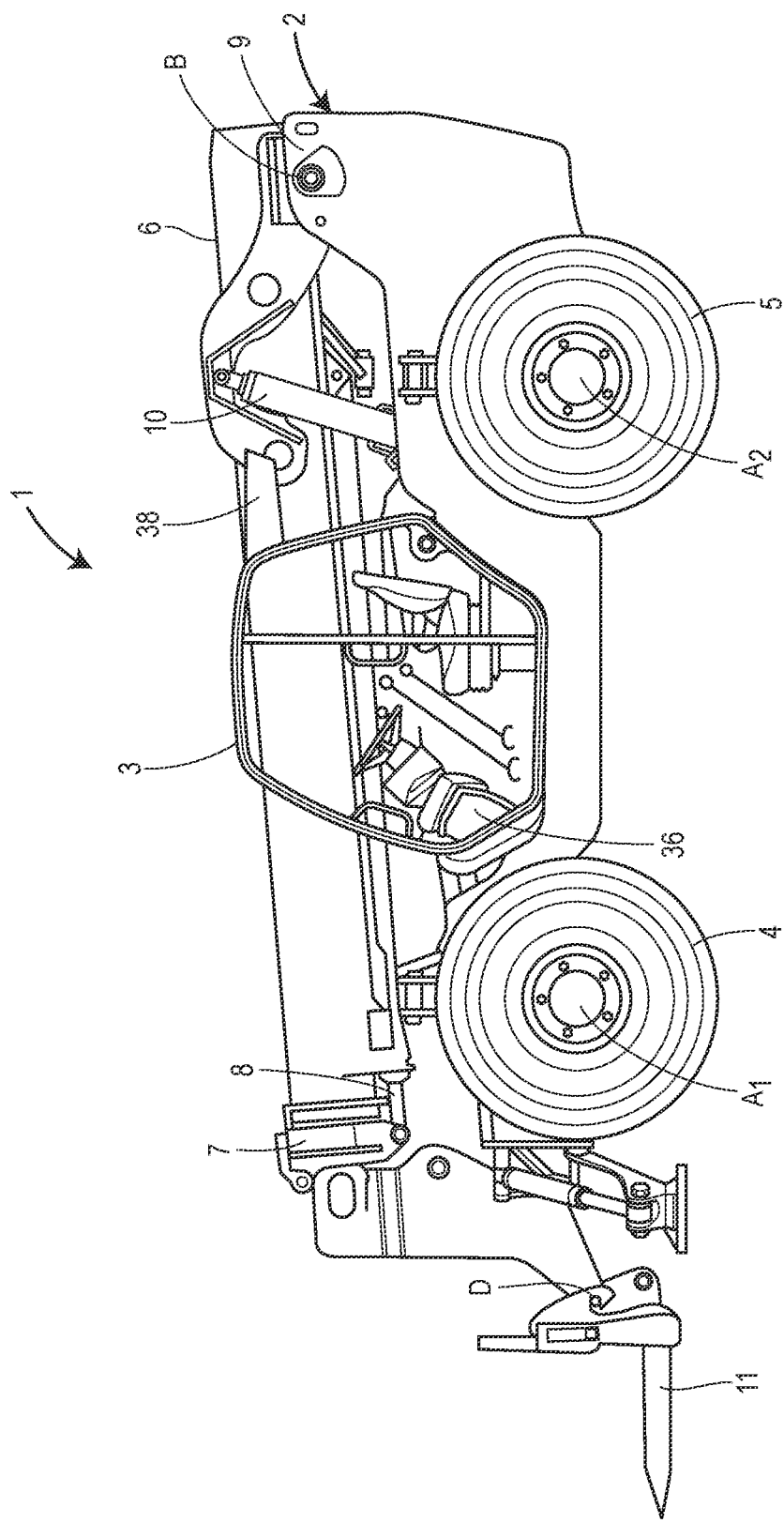
FIG. 1 is a side view of a working machine of an embodiment of the present teachings.

With reference to FIG. 1, an embodiment includes a working machine 1 which may be a load handling machine. In this embodiment the load handling machine is a telescopic handler. In other embodiments the working machine 1 may be a skid-steer loader, a compact track loader, a wheel loader, or a telescopic wheel loader, a slew excavator, a backhoe loader, a dumper or a tractor for example. Such machines may generally be denoted as off-highway working machines. All such machines include a hydraulic fluid circuit arranged to provide hydraulic fluid to one or more hydraulic actuators for performing working operations such as moving a working arm of a loader or excavator; tipping a skip of a dumper; or lifting or powering an implement of a tractor.

The machine 1 includes a machine body 2. The body 2 may include an operator structure 3 to accommodate a machine operator, for example, an enclosed operator structure from which an operator can operate the machine 1. The working environment in the operator structure 3 can be separate from its surroundings. In other embodiments, the working machine 1 may have an open canopy structure (not shown) for the operator.

In an embodiment, the machine 1 has a ground engaging propulsion structure comprising a first axle A1 and a second axle A2, each axle being coupled to a pair of wheels (two wheels 4, 5 are shown in FIG. 1 with one wheel 4 connected to the first axle A1 and one wheel 5 connected to the second axle A2). The first axle A1 may be a front axle and the second axle A2 may be a rear axle. One or both of the axles A1, A2 may be coupled to a motor M (see FIG. 2 discussed below) which is configured to drive movement of one or both pairs of wheels 4, 5. Thus, the wheels 4, 5 may contact a ground surface and rotation of the wheels 4, 5 may cause movement of the working machine 1 with respect to the ground surface. In other embodiments, the ground engaging propulsion structure may comprise tracks or rollers. In other embodiments, the drive transmission may not be operated by the motor M via a direct mechanical linkage, but instead the motor M may drive a hydraulic pump, which subsequently provides traction via one or more hydraulic motors that are drivingly connected to the wheels or tracks. Alternatively, the drive transmission may comprise an electric motor for providing traction to the wheels or tracks.

A load handling apparatus 6, 7 is coupled to the machine body 2. The load handling apparatus 6, 7 may be mounted by a mount 9 to the machine body 2. In an embodiment, the load handling apparatus 6, 7 includes a working arm 6, 7.

The working arm 6, 7 may be a telescopic arm having a first section 6 connected to the mount 9 and a second section 7 which is telescopically fitted to the first section 6. In this embodiment, the second section 7 of the working arm 6, 7 is telescopically moveable with respect to the first section 6 such that the working arm 6, 7 can be extended and retracted. Movement of the first section 6 with respect to the second section 7 of the working arm 6, 7 may be achieved by use of an extension actuator 8 which may be a double acting hydraulic linear actuator. One end of the extension actuator 8 is coupled to the first section 6 of the lifting arm 6, 7 and another end of the extension actuator 8 is coupled to the second section 7 of the working arm 6, 7 such that extension of the extension actuator 8 causes extension of the working arm 6, 7 and retraction of the extension actuator 8 causes retraction of the working arm 6, 7. As will be appreciated, the working arm 6, 7 may include a plurality of sections: for example, the working arm 6, 7 may comprise two, three, four or more sections. Each arm section may be telescopically fitted to at least one other section.

The working arm 6, 7 can be moved with respect to the machine body 2 and the movement is preferably, at least in part, rotational movement about the mount 9 (about pivot B of the working arm 6, 7). The rotational movement is about a substantially transverse axis of the machine 1, the pivot B being transversely arranged.

Rotational movement of the working arm 6, 7 with respect to the machine body 2 is, in an embodiment, achieved by use of at least one lifting actuator 10 coupled, at one end, to the first section 6 of the working arm 6, 7 and, at a second end, to the machine body 2. The lifting actuator 10 is a double acting hydraulic linear actuator, but may alternatively be single acting. In some embodiments, the lifting actuator is an electric linear actuator.

A load handling implement 11 may be located at a distal end of the working arm 6, 7. The load handling implement 11 may include a fork-type implement which may be rotatable with respect to the working arm 6, 7 about a pivot D, this pivot also being transversely arranged. Other implements may be fitted such as shovels, grabs etc. Movement of the load handling implement 11 may be achieved by use of a double acting linear hydraulic actuator (not shown) coupled to the load handling implement 11 and the distal end of the section 7 of the working arm 6, 7.

In the illustrated embodiment, the operator structure 3 has a fixed angular orientation with respect to the front and/or rear axles A1 and A2.

The working machine 1 includes an operator structure climate control assembly 36 for selectively adding and/or removing thermal energy to/from the operator structure 3 for selectively warming and/or cooling of the operator structure 3, for example to preheat the operator structure 3. The climate control assembly 36 is located in the operator structure 3. The climate control assembly 36 includes an operator structure heat exchanger 58 configured to selectively add/remove thermal energy to/from the operator structure 3. The heat exchanger 58 includes an operator structure cooler 80, for example an air conditioning system, configured to selectively remove thermal energy from the operator structure 3. The heat exchanger 58 includes an operator structure heater 59 configured to selectively add thermal energy to the operator structure.

The working machine 1 of FIG. 1 is provided with an outside heat exchanger assembly 38 that is mounted to the rear of the operator structure 3, and is discussed in more detail below. In other embodiments, the outside heat exchanger assembly 38 may be mounted at other locations on the operator structure 3, or at other locations on the working machine 1.

Figure 2:
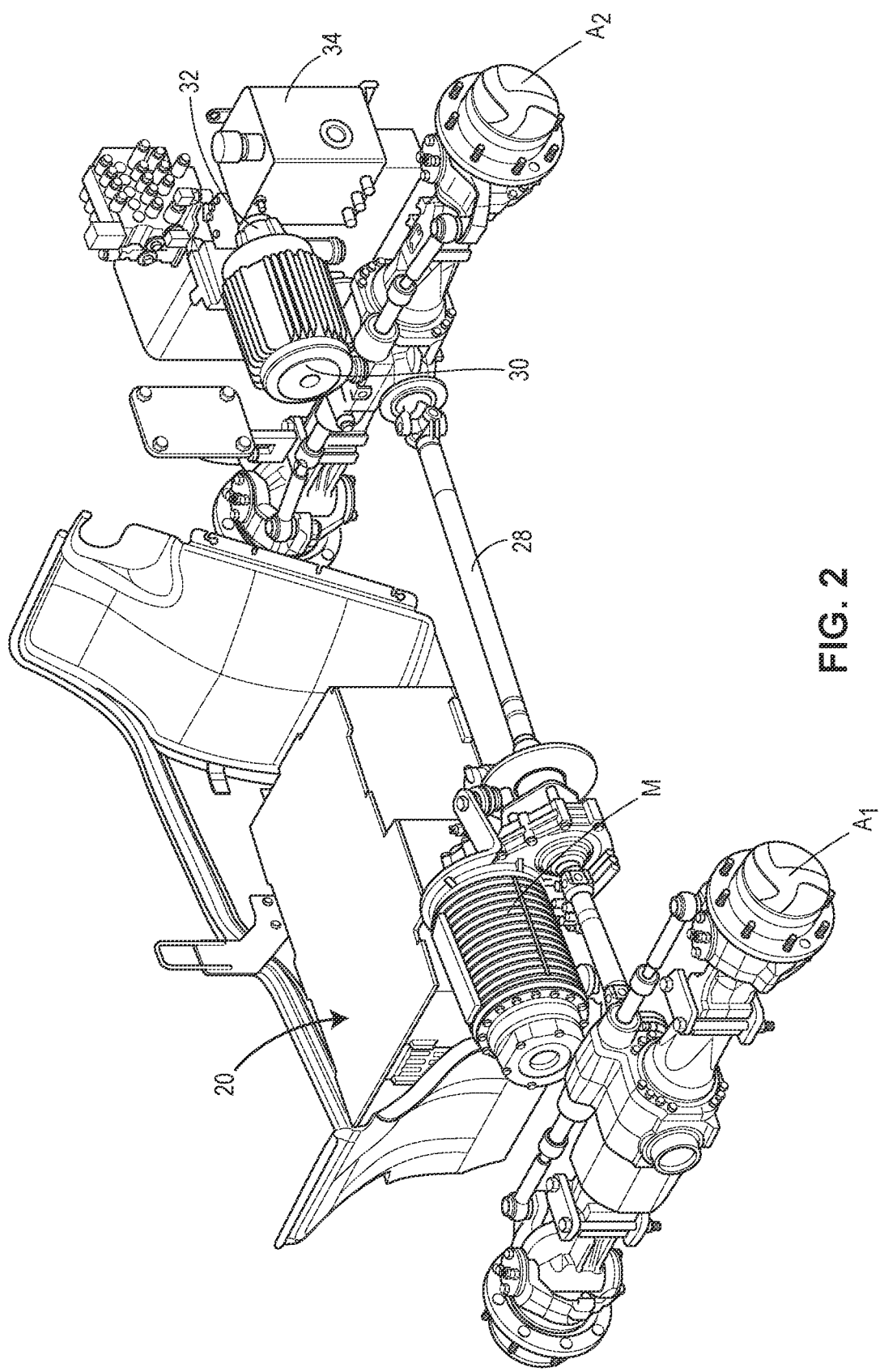
FIG. 2 is an isometric view of a powertrain of the machine of FIG. 1.

With reference to FIG. 2, the working machine 1 is an electric working machine having an electric energy storage unit 20 for providing electrical power to the working machine 1. In this embodiment the electrical energy storage unit 20 comprises batteries, but in other embodiments may utilize capacitors or a combination of batteries and capacitors; or other storage technologies. In other embodiments the working machine 1 may be a "hybrid" working machine in which an internal combustion engine (ICE) and electric motors may both supply power to the ground engaging propulsion structure and/or the actuators to displace the working arm(s) 6, 7.

The working machine 1 includes an electric drive motor M coupled to the electric energy storage unit 20 via suitable control electrics (not shown) and configured to drive movement of one or both pairs of wheels 4, 5. The motor M is coupled to a driveshaft 28 to drive movement of the wheels 4, 5 via axles A1 and A2. The working machine 1 also includes a separate hydraulic pump electric motor 30 configured to drive a hydraulic pump 32 to move the working arms 6, 7, e.g. to actuate the actuators 8, 10. The hydraulic motor 30 is positioned proximal to the mount 9 of the load handling apparatus 6, 7. In other embodiments, a single motor may provide drive for traction and actuation of a working arm.

It is known that to increase the efficiency of operation of the working arm 6, 7, it is desirable for the hydraulic fluid 26 to be within an optimal temperature range that is typically above ambient temperature, e.g. a temperature range of 40-60° C. At this temperature, the viscosity of the hydraulic fluid 26 is reduced and therefore frictional losses as it circulates within the hydraulic circuit 25 (see FIG. 3) are reduced. Additionally, wear on the valves and other components within the circuit 25 may be reduced at this temperature. Temperatures above this range may however cause damage to components in the circuit 25, e.g. due to improper lubrication, or sub-optimal performance, e.g. leakage from the breakdown of seals, and this is also undesirable.

When the working machine 1 has been inactive for a period of time (e.g. overnight) in most operating environments, the temperature will be below this desirable range and it will take a period of time for the fluid to reach this range (as a result of frictional effects as it circulates) dependent upon ambient temperatures and the intensity with which the machine is operated. In the intervening period, the operational efficiency of the machine is reduced. In some circumstances where the working arms are not operated intensively, the temperature may not achieve the desired range. The present inventors have therefore recognized the advantage of preheating the hydraulic fluid 26 to the desirable range to increase the efficiency of operation of the working machine 1. Further, if the machine has been operating intensively for an extended period of time it is possible that the hydraulic fluid 26 exceeds the desirable temperature range, which may also be undesirable for the reasons stated above.

The present inventors have recognized that at the same time, there may be a demand for heat to be supplied to the operator structure 3 to improve operator comfort. The present inventors have recognized that the usage of electrical power supplied from the electrical energy storage unit 20 in such circumstances makes inefficient usage of this limited resource when a supply of thermal energy may already be available from the hydraulic fluid 26.

The present inventors have also recognized that, in certain conditions, for example if the working machine 1 absorbs high levels of thermal energy (i.e. a solar load) from the sun, the operator structure 3 may exceed the desirable temperature range for optimal user comfort. At the same time, there may be a demand for heat to be supplied to the hydraulic fluid 26 in order to raise the hydraulic fluid temperature to within the optimal temperature range so as to improve the efficiency of the working machine 1. The present inventors have recognized that the use of electrical power supplied by the storage unit 20 in such circumstances makes inefficient usage of this limited resource when a supply of thermal energy may already be available from the operator structure 3.

In order to enable the preheating of the hydraulic fluid and/or the operator structure 3, and the transfer of thermal energy between the hydraulic fluid and the operator structure 3, the working machine 1 includes a thermal management system 50. The thermal management system 50 is configured to connect a heat exchanger 52 arranged to selectively add and/or remove thermal energy from the hydraulic fluid circuit 25 to the operator structure 3 (i.e. via the operator structure climate control assembly 36).

The thermal management system 50 is configured to determine a thermal energy requirement of the operator structure 3 based on a target operator structure temperature, and to determine a thermal energy requirement of the hydraulic fluid based on a target hydraulic fluid temperature. The thermal management system 50 includes an energy distribution system to selectively transfer thermal energy between the operator structure 3 and the hydraulic fluid 26, based on the determined energy requirements thereof. It will be appreciated that the energy distribution system may be configured to selectively transfer thermal energy between the operator structure 3 and the hydraulic fluid 26 both during operation of the working machine 1 and whilst the working machine 1 is charging. This enables the thermal management system 50 to preheat the operator structure 3 and/or the hydraulic fluid 26 while the working machine 1 is charging, and to maintain optimal temperatures for the operator structure 3 and the hydraulic fluid 26 during operation of the working machine 1.

Figure 3:
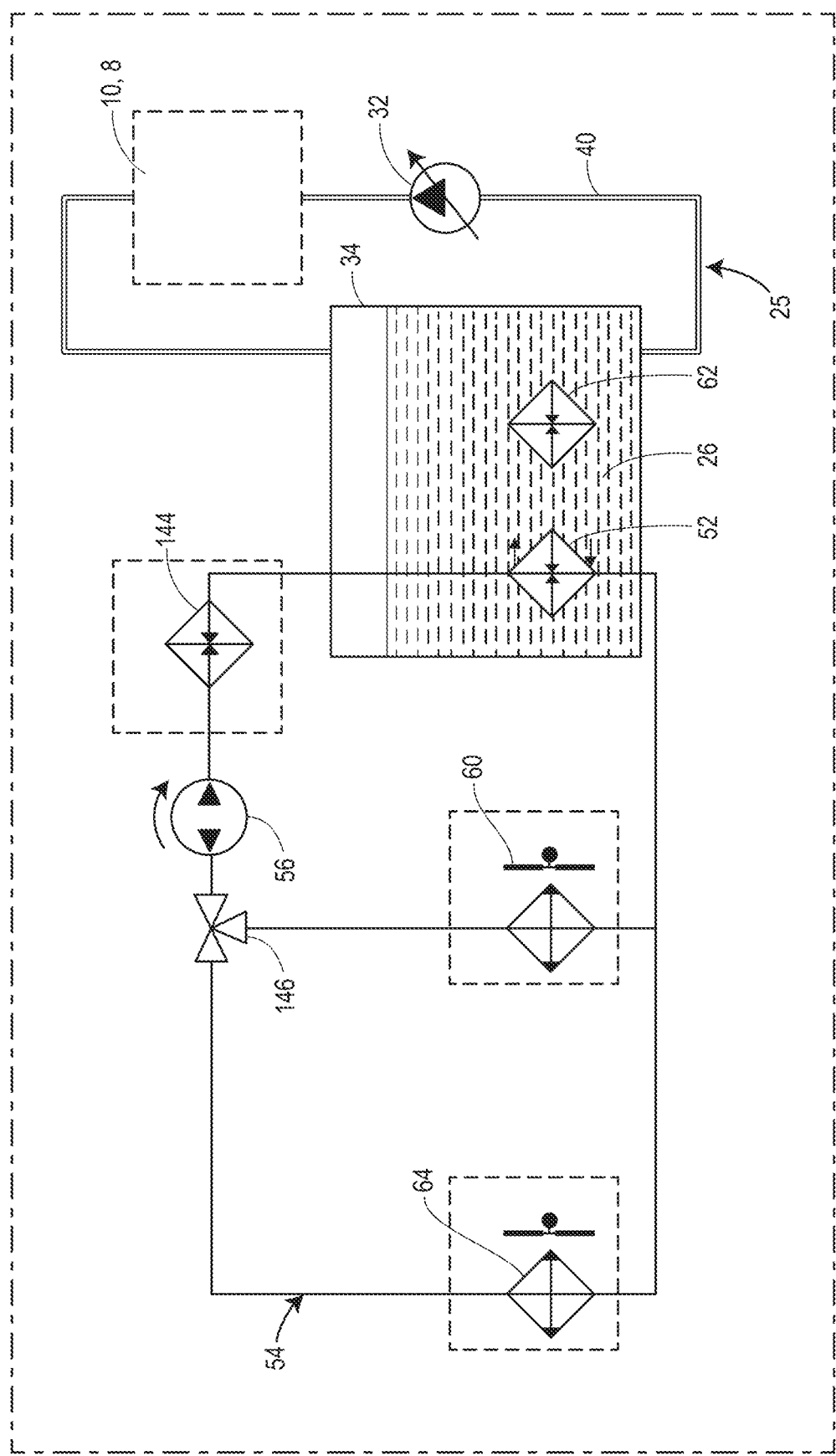
FIG. 3 is a schematic diagram of a thermal management system for the working machine of FIGS. 1 and 2.

Referring now to FIG. 3, a thermal management system 50 of the working machine 1 is illustrated. The thermal management system 50 includes a hydraulic fluid heat exchanger 52, for example a liquid/liquid heat exchanger. The hydraulic fluid heat exchanger 52 is located within a hydraulic fluid reservoir 34 so as to be immersed in the hydraulic fluid 26. The energy distribution system of this embodiment features a coolant pump 56 for transferring a working fluid, e.g. a coolant such as ethylene-glycol, around a circuit 54 based on the state of a circuit switch 146, i.e. a coolant switch 146. The circuit 54 is in thermal communication with the hydraulic fluid heat exchanger 52 and to an operator structure heat exchanger 58, that forms part of the cabin climate control assembly 36. The operator structure heat exchanger 58 may be a liquid/gas heat exchanger.

The operator structure climate control assembly 36 includes a fan or a blower 60 that blows air over the operator structure heat exchanger 58 and into the operator structure 3. A hydraulic fluid heater 62, e.g. a heating element, is immersed within the hydraulic fluid 26 in the hydraulic fluid reservoir 34. It will be appreciated that, the hydraulic fluid heater 62 may also in thermal communication with the circuit 54. An outside, i.e. external, heat exchanger 64 is also in thermal communication with the circuit 54.

FIG. 3 shows the hydraulic fluid circuit 25 in simplified form (e.g. without control valves etc.). The hydraulic fluid circuit 25 includes the hydraulic fluid reservoir 34, supply flow path 40 to the hydraulic pump 32. The hydraulic circuit 25 includes a machine load, which in this embodiment includes the extension actuator 8 and lift actuator 10. In alternative arrangements, the machine load may include other devices in the circuit, and may include an auxiliary circuit to supply hydraulic fluid to an implement 11 mounted to the working arm 6, 7. Once the hydraulic fluid has been utilized by the component(s) of the working machine 1 it is returned to the reservoir 34 via the hydraulic flow path 40. Energy transfer between the hydraulic fluid circuit 25 and the operator structure 3 is achieved using an energy transfer medium such as a water/glycol mixture pumped in a circuit between the hydraulic fluid circuit 25 and the operator structure 3.

The thermal management system 50 enables coolant to be circulated by the energy distribution system around the circuit 54, and is capable of drawing heat from the hydraulic fluid 26 in the reservoir 34 and supplying it to the operator structure 3 (via heat exchanger 58) if there is a thermal energy surplus of the hydraulic fluid 26 and a thermal energy deficit of the operator structure 3.

The thermal management system 50 enables coolant to be circulated by the energy distribution system around the circuit 54, and is capable of drawing heat from the operator structure 3 and supplying it to the hydraulic fluid heat exchanger 52, if there is a thermal energy surplus of the operator structure 3 and a thermal energy deficit of the operator structure 3.

The circuit 54 includes a working fluid heater, i.e. a coolant heater, 144 to selectively heat the working fluid in the circuit 54. The provision of the heater 144 enables the temperature of the working fluid to be increased, should external energy be required so as to heat the operator structure 3 and/or hydraulic fluid 26.

The thermal management system 50 enables the hydraulic fluid to be kept within a desirable operating temperature range and also maintain the operator structure temperature at a desirable level for an operator. It will be appreciated that the thermal management system 50 is able to reject or discard excess thermal energy to the atmosphere, e.g. via the outside heat exchanger 64.

It will be understood that the thermal management system 50 is configured to operate when the working machine 1 is in an 'active' state. Put another way, the thermal management system 50 is configured to operate when the working machine is either charging or in use (i.e. turned on).

Figure 4:
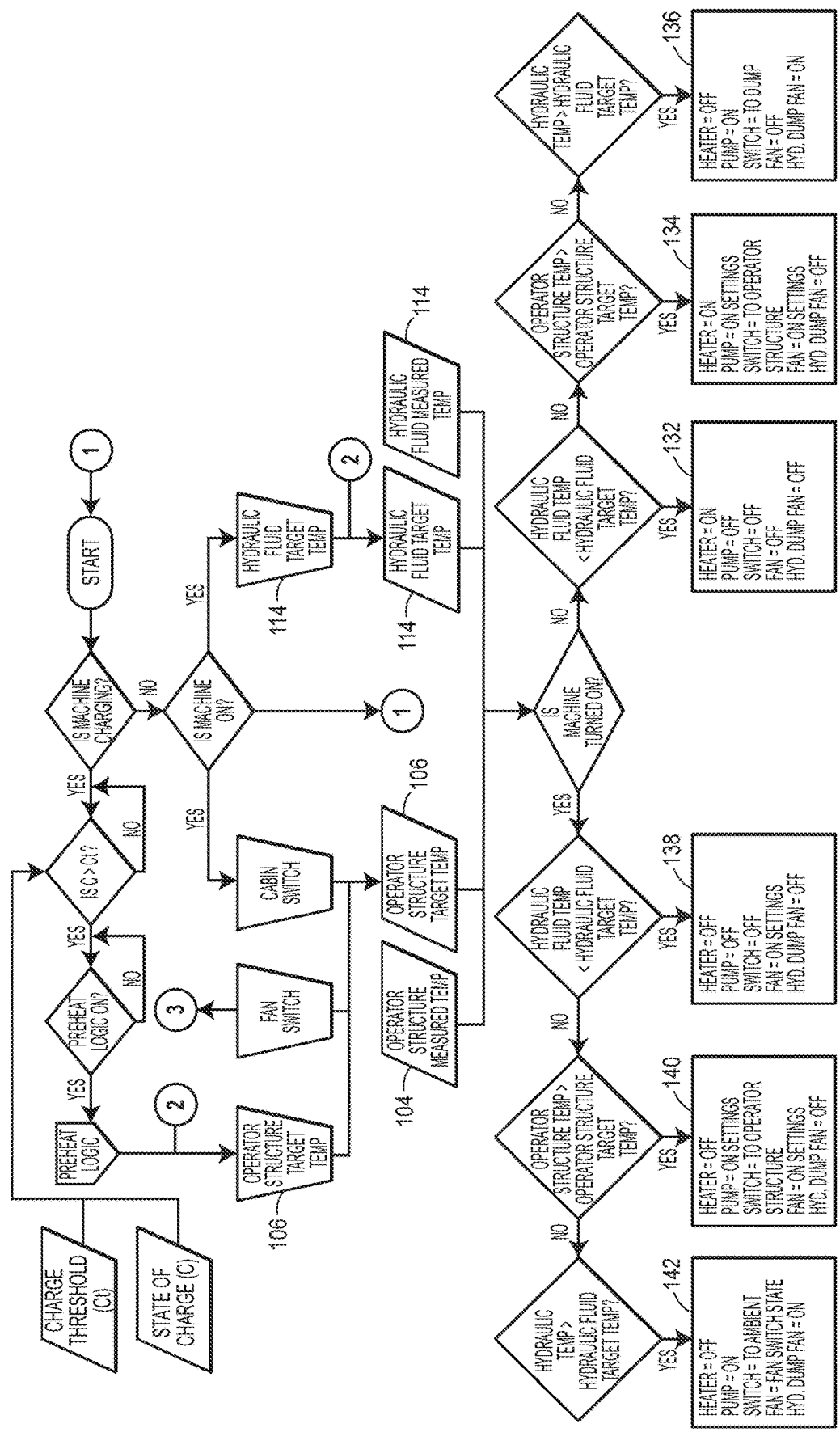
FIG. 4 is a control logic diagram for the thermal management of FIG. 3.

Referring to FIG. 4, the control logic for the thermal management system 50 of FIG. 3 is shown. The control logic controls the transfer of thermal energy between the hydraulic fluid 26 and the operator structure 3, and enables pre-heating during charging of the working machine 1, and efficient energy transfer during operation of the working machine 1.

The working machine 1 includes a sensor (not shown) for measuring the temperature 104 of the operator structure 3. The working machine 1 includes a sensor (not shown) for measuring the temperature 112 of the hydraulic fluid 26. When the working machine is charging (but not turned on), the thermal management system 50 is configured to pre-heat the hydraulic fluid 26 and the operator structure 3 to their respective target temperatures 114, 106.

The thermal management system 50 has three charging states of operation to efficiently preheat the hydraulic fluid 26 and the operator structure 3.

In a first charging state of operation 132 of the thermal management system 50, the measured hydraulic fluid temperature 112 is less than the target hydraulic fluid temperature 114, and there is a heating requirement of the hydraulic fluid 26. In order to supply thermal energy to the hydraulic fluid 26, the hydraulic fluid heater 62 and the coolant heater 144 are switched on and powered by the electric power charging the working machine 1

The thermal management system 50 may be configured to prioritize pre-heating of the hydraulic fluid 26 to promote efficient operation. In some arrangements, the coolant pump 56 and coolant switch 146 of the energy distribution system may be switched off until the hydraulic fluid 26 has reached the target hydraulic fluid temperature 114. In some arrangements, the fan 60 of the operator structure climate control assembly 36 may be switched off, this is because it might be assumed that the operator structure 3 is vacant when the working machine 1 is charging.

In a second charging state of operation 134 of the thermal management system 50, the measured hydraulic fluid temperature 112 is at of close to the target hydraulic fluid temperature 114. In said second charging state of operation 134, if the measured operator structure temperature 104 is less than the target operator structure temperature 106, there is a heating requirement.

The thermal management system 50 controls the operator structure climate control assembly in order to pre-heat the operator structure 3 to the target temperature of the operator structure 106.

The thermal energy generated by the hydraulic fluid heater 62 and/or the coolant heater 144 may be used to pre-heat the operator structure 3. The thermal management system 50 is able to determine the coolant pump speed and flow rate. The coolant switch 146 may be configured to direct coolant from the hydraulic fluid heat exchanger 52 to the operator structure heat exchanger 58 via the circuit 54 to transfer thermal energy from the hydraulic fluid heater 62 to the operator structure 3. In some arrangements, the coolant may be heated directly via the coolant heater 144.

In a third charging state 136 of the thermal management system 50, the hydraulic fluid measured temperature 106 reaches and/or exceeds the hydraulic fluid target temperature 114. In said third charging state 136, the thermal management system 50 is configured to turn off the hydraulic fluid heater 62 and/or the coolant heater 144 to reduce the generation of unnecessary generation of thermal energy. The coolant pump 56 directs the flow of the coolant to the outside heat exchanger 64 to reject thermal energy to the atmosphere. The thermal management system 50 control logic implements feedback loops with the aim of preventing an excess of thermal energy being supplied to the hydraulic fluid, because this will decrease the efficiency of the working machine 1.

During operation of the working machine 1, the thermal management has three operational states to efficiently transfer thermal energy around the working machine 1.

In a first operational state 138, the measured hydraulic fluid temperature 112 is less than the target hydraulic fluid temperature 114, and there is a heating requirement of the hydraulic fluid 26. In said first operational state, the thermal energy of the hydraulic fluid 26 will increase as the hydraulic fluid 26 flows around the working machine 1, e.g. to operate the working arm 6, 7. Due to this, externally supplied thermal energy, e.g. from the hydraulic fluid heater 62 and coolant heater 144, may not be required and so may be turned off.

It will be appreciated that the thermal management system 50 may be configured to prioritize pre-heating of the hydraulic fluid 26 to promote efficient operation thereof. This may mean that the coolant pump and coolant switch 146 are switched off until the hydraulic fluid 26 has reached the target hydraulic fluid temperature 114.

In a second operational state 140, the measured hydraulic fluid temperature 112 has reached the target hydraulic fluid temperature 114, and the measured operator structure temperature 104 is less than the target operator structure temperature 106, there is a heating requirement of the operator structure 3.

During operation of the working machine 1, it will be understood that thermal energy will continuously be generated in the hydraulic fluid 26. The excess thermal energy generated may be used to heat the operator structure. In such arrangements, the hydraulic fluid heater and the coolant heater 144 can be switched off. The thermal management system directs the flow of coolant from the hydraulic fluid heat exchanger 52 to the operator structure heat exchanger 58 via the circuit 54 to transfer thermal energy from the hydraulic fluid 26 to the operator structure 3.

In a third operational state 142, the measured temperature of the operator structure 104 has reached the target temperature 114, there is a cooling requirement of the hydraulic fluid 26 due to thermal energy generated therein by operation of the working machine 1.

In order to remove thermal energy from the hydraulic fluid 26, the thermal management system 50 activates the coolant pump 56 and the coolant switch 146. Flow of coolant is directed to the outside heat exchanger 64 and reject thermal energy from the coolant to the atmosphere.

It will be appreciated that in the first, second a third operational states 138, 140, 142 require sufficient thermal energy to be generated within the hydraulic fluid during operation of the working machine so as to heat both the hydraulic fluid 26 and the operator structure 3. However, if this is not the case, e.g. if the working machine 1 is not being operated at maximum capacity, the thermal management system is configured to supply additional thermal energy, e.g. from the coolant heater 144, to heat the hydraulic fluid 26 and the operator structure 3.

The thermal management system 50 may be further configured to transfer thermal energy from the operator structure 3 to the hydraulic fluid 26, although this is not illustrated in FIG. 4. The coolant pump 56 pumps coolant around the circuit 54 and the coolant switch directs the flow of coolant from the operator structure heat exchanger 58 to the to the hydraulic fluid heat exchanger 52 to supply thermal energy to the hydraulic fluid 25. The thermal management system 50 may also be configured to transfer thermal energy from the atmosphere to the operator structure 3 and/or the hydraulic fluid 26.

It will be understood that the thermal management system 50 the thermal management system 50 is activated when the state of charge of the working machine 1 reaches a predetermined threshold 130. Typically, the predetermined threshold 130 of charge of the working machine 1 is approximately 90%, but any suitable charge state may be used. When the charge state of the working machine 1 reaches this predetermined threshold, the thermal management system 50 pre-heats the operator structure 3 and hydraulic fluid 26 to pre-determined target temperatures 106, 114.

Figure 5:
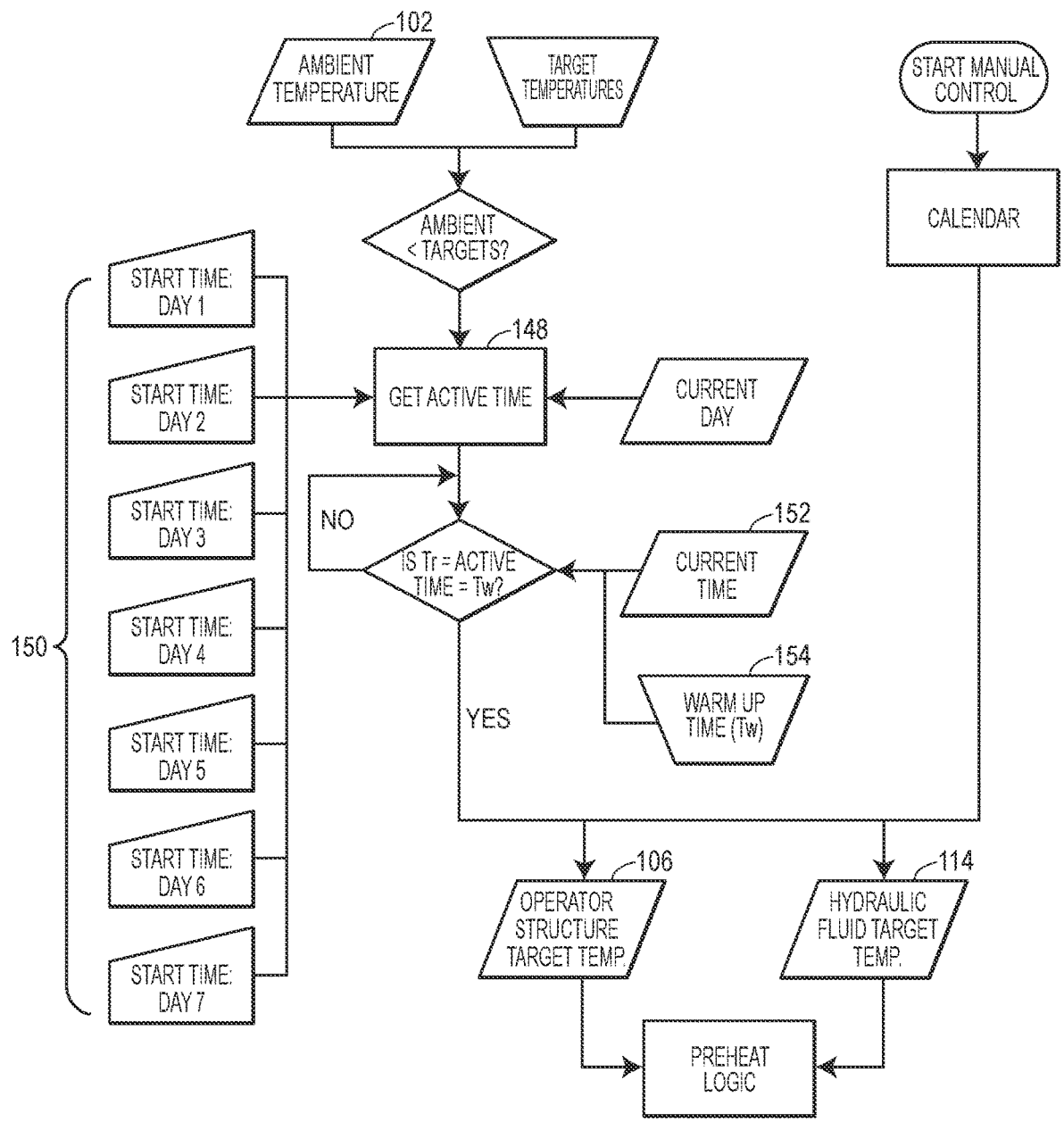
FIG. 5 is a control logic diagram for determining an operator structure target temperature, a hydraulic fluid target temperature, and an expected time of operation.

The thermal management system 50 may be configured to preheat the operator structure 3 and hydraulic fluid 26 to their target temperatures for an expected time (i.e. an expected start time) of operation 1 of the working machine 1. This preheat logic process is illustrated in FIG. 5. In some arrangements, this expected time of operation (or 'Get Active Time') 148 may be inputted manually by an operator (via a start manual control function). In alternative arrangements, this expected time of operation 148 may be determined based on historic operation start times 150. Once the current time 152 equals the expected time of operation 148 minus the time required to heat up the operator structure and hydraulic fluid 154 (the warm up time), the thermal management system 50 will begin preheating.

The preheat control logic of FIG. 5 is, in this embodiment, processed by the thermal management system 50 of the working machine 1. However, it shall be appreciated that in alternative embodiments, the control logic could be carried out remotely with the output of the preheat logic transmitted (e.g. wirelessly) and inputted into the thermal management system 50.

The thermal management system 50 of this embodiment is particularly advantageous for use in compact working machines with spatial limitations e.g. mini excavators which cannot accommodate bulky and heavy equipment.

Referring now to FIGS. 6 to 9, an alternative thermal management system 50 of the working machine 1 is illustrated schematically.

The thermal management system 50 includes a cooling circuit 76 and a heating circuit 78. A heat transfer fluid or coolant such as water-ethylene-glycol mix may be used in both the heating and cooling circuits 76, 78. Both the heating and cooling circuits 76, 78 use coolant pumps 56a, 56b to circulate the coolant around the circuit. The thermal management system 50 is configured to control the flow rate and distribution of the heat transfer fluid depending on the rate and direction of heat transfer required from the energy requirement of the working machine 1 and the local energy requirements of the hydraulic fluid 26 and the operator structure 3.

The cooling circuit 76 is selectively connected to the operator structure cooler 80 via a flow control valve 82. The cooling circuit 76 is also connected to an outside heat exchanger 64 by first and second three way flow control valve arrangements 84a and 84b. Finally, the cooling circuit 76 is connected to the hydraulic fluid heat exchanger 52 via two further three way flow control valve arrangements 86a and 86b. The third port of the three way flow control valve arrangements 84a, 84b, 86a and 86b are connected to the heating circuit 78 such that the three way flow control valve arrangements can switch to the flow of either the cooling circuit 76 or heating circuit 78 as is required.

The heating circuit 78 is also selectively connected to the operator structure heater 59 via a further flow control valve 88. The operator structure cooler 80 and heater 59 are both, in this embodiment, provided as part of an operator structure climate control assembly 36 that also includes a fan 60 that blows outside air past both the operator structure cooler 80 and operator structure heater 59 and into the operator structure 3 via suitable vents in order to provide for operator structure 3 heating or cooling as required. The operator structure climate control assembly 36 also allows air within the operator structure 3 to be recirculated through the operator structure cooler 80 or heater 59 in certain embodiments.

The energy distribution system of this embodiment features a heat pump circuit. The heat pump circuit includes a vapor compression refrigerant circuit to facilitate the transfer of thermal energy between the heating circuit and cooling circuit 78, 76. The refrigerant circuit comprises a compressor 68 in series with a condenser 70, an expansion device 72 and an evaporator 74. The cooling circuit 76 is connected to the evaporator 74 and the heating circuit 78 is connected to the condenser 70 such that thermal energy may be transferred from the cooling circuit 76 to the heating circuit 78 via the refrigerant circuit 66. The refrigerant circuit 66 is a closed loop and contains a suitable refrigerant such as R134a or R1234yf.

The work done by the refrigerant compressor 68 of the energy distribution system on the refrigerant increases the enthalpy (i.e. the energy content) of the refrigerant and enables thermal energy to be transferred from a location of lower temperature to a location of higher temperature. This is particularly advantageous for this application because it is possible that when heat transfer occurs from the operator structure 3 to the hydraulic fluid 26, the hydraulic fluid 26 will already be at a higher temperature than the operator structure. Without the refrigerant compressor, heat transfer in this case would occur from the hydraulic fluid 26 to the operator structure even though the heating requirement for the optimal performance of the working machine 1 is in the opposite direction.

The thermal management system 50 comprises a hydraulic fluid heat exchanger 52 located within the hydraulic fluid reservoir 34 to be immersed within the hydraulic fluid 26, for example a liquid/liquid heat exchanger. The hydraulic fluid heat exchanger 52 is connected to a circuit 54 of the thermal management system 50 that is filled with a suitable working liquid such as ethylene-glycol and that is circulated by means of a coolant pump 56*a*, 56*b* to the operator structure heat exchanger 58, for example a liquid/gas heat exchanger, that forms part of the operator structure climate control assembly 36. The circuit 54 then returns the coolant to the hydraulic fluid heat exchanger 52. It will be appreciated that the transfer of thermal energy from the hydraulic fluid reservoir 34 to the hydraulic fluid heat exchanger 52 may take place by free convection due to the difference in temperature gradients. Alternatively, there may be an external source, for example a pump or a fan, to promote forced convection.

In some embodiments, a heating element is also immersed within the hydraulic fluid 26 in the hydraulic fluid reservoir 34. Both the coolant pumps 56*a*, 56*b* and the heating element are, in this embodiment, electrically powered. Electrical power may be provided either to or from an external power source e.g. mains electrical power via a charger (not shown) or from the electrical energy storage unit 20.

In order to raise the temperature of the hydraulic fluid 26 to the desirable operating range after an extended period where the working machine 1 is inoperative, the heating element may be used to preheat the hydraulic fluid 26. Whilst the heating element is electrically powered, such preheating may occur whilst the working machine 1 is placed onto charge overnight. This means that the electrical power is not supplied from the electrical energy storage unit 20 on the working machine 1, which would otherwise reduce the electrical energy available to the working machine 1 for performing working operations.

In addition, if the hydraulic fluid 26 is preheated at the very start of operation of the working machine 1, this means that the thermal energy of the hydraulic fluid 26 can be used to supply heat to the operator structure 3 straight away, or at least with a much reduced delay. Indeed, if low outside air temperatures are anticipated for a particular working day, the heating element may be controlled in such a way as to heat the hydraulic fluid to a higher temperature than may otherwise be required in anticipation of some of said heat being supplied to the operator structure climate control assembly 36 immediately upon vehicle operation or to preheat the operator structure 3 before the operator enters it.

In order to ensure that thermal energy can be transferred both from the hydraulic fluid 26 to the operator structure 3 and from the operator structure 3 to the hydraulic fluid, the heat exchangers of the embodiment of FIGS. 6 to 9 are configured to selectively switch between the heating circuit 78 and the cooling circuit 76. The cooling circuit 76 is connected to the evaporator 74 and the heating circuit 78 is connected to the condenser 70 such that thermal energy may be transferred from the cooling circuit 76 to the heating circuit 78 via the refrigerant circuit 66.

In FIGS. 6 to 9, the flow of heated coolant in the heating circuit 78 is denoted by a thick solid line whereas an inoperative part of the heating circuit 78 is denoted by dotted lines. The flow of coolant in the cooling circuit 76 is denoted by a solid thin line, whereas inoperative parts of the coolant circuit are also denoted by broken lines.

Figure 6:
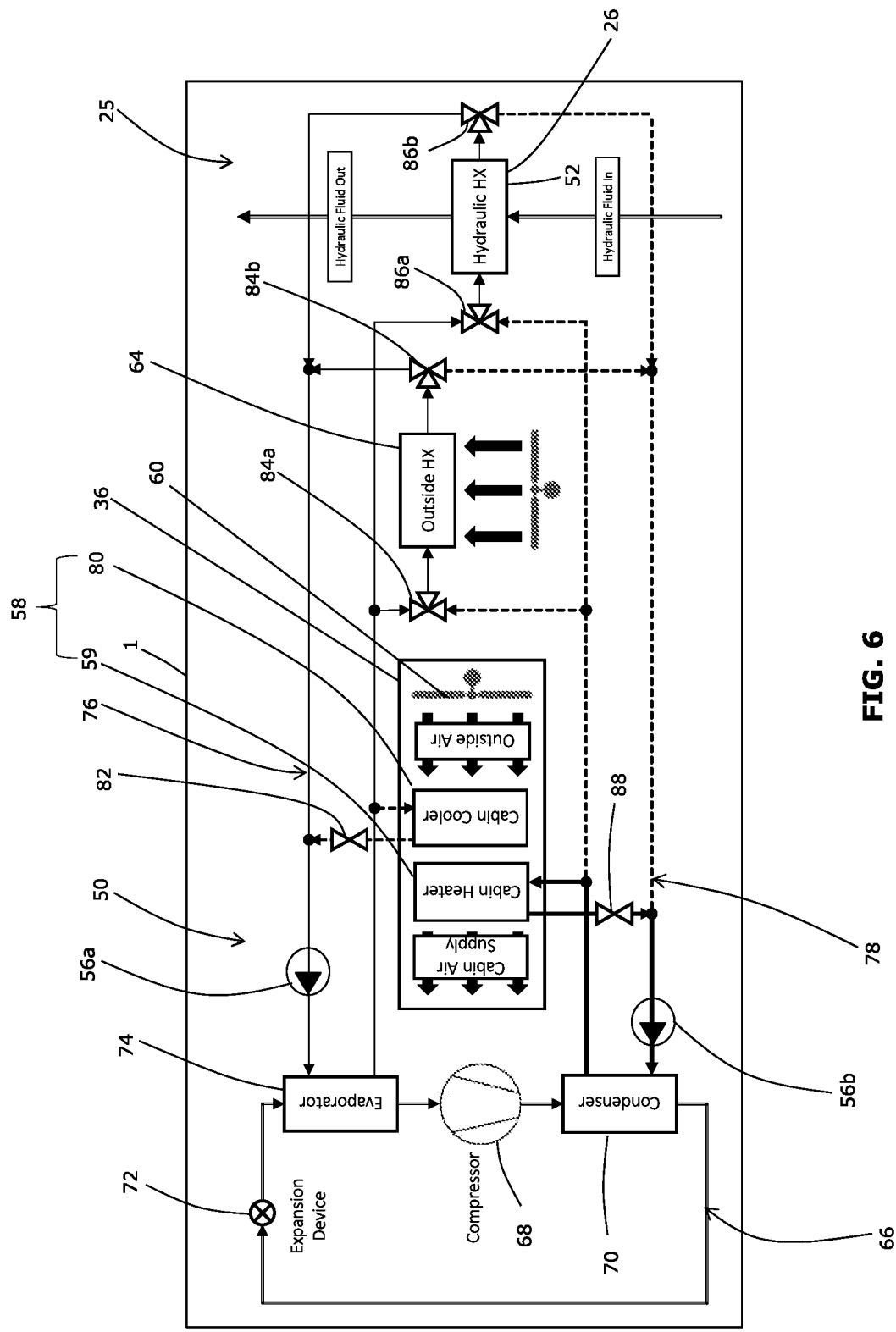
FIG. 6 is a schematic diagram of a thermal management system for the working machine of FIGS. 1 and 2 shown in a first mode of operation.

In FIG. 6, the thermal management system 50 is operating with thermal energy being absorbed by the refrigerant circuit 66 via the following heat transfer process: thermal energy in the hydraulic fluid flowing in the hydraulic flowing circuit 25 is transferred to the cooling circuit 76 via the hydraulic fluid heat exchanger 52 and from ambient air via the outside heat exchanger 64. This thermal energy is then transferred from the cooling circuit 76 to the refrigerant circuit 66 via the evaporator 74 and the refrigerant circuit 66 then transfers this heat to the operator structure heater 59 via the condenser 70 and the heating circuit 78. The fan 60 blows outside air over the operator structure heater 59 to raise the temperature within the operator structure 3. It can be seen that the flow control valve 82 is closed so that the operator structure cooler 80 is inoperative.

In order to maintain the desired viscosity of the hydraulic fluid, the rate of coolant flow through the hydraulic fluid heat exchanger 52 is metered to control the rate of heat rejection from the hydraulic fluid, with any shortfall in the heat required to be transferred to the operator structure heater 59 being supplied by the outside heat exchanger 64.

Figure 7:
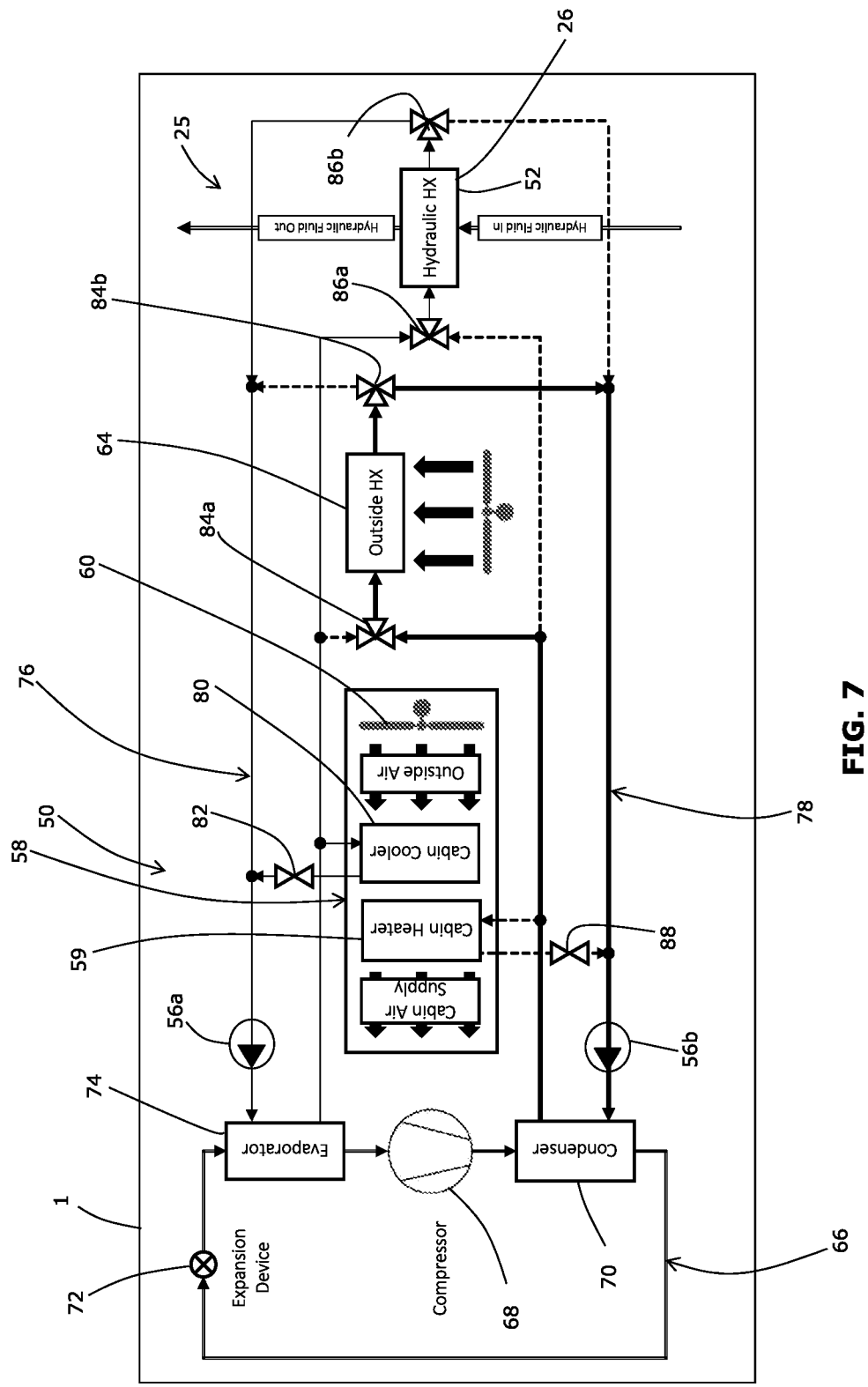
FIGS. 7, 8 and 9 illustrate the thermal management system of FIG. 6 in differing modes of operation.

FIG. 7 illustrates the thermal management system 50 operating in a different mode which reflects a situation in which the working machine 1 is operating in a high ambient temperature and the hydraulic fluid and the operator structure 3 simultaneously require cooling. Accordingly, in this situation thermal energy is absorbed by the refrigerant circuit 66 via the transfer of thermal energy from the hydraulic fluid in the hydraulic fluid circuit 25 to the refrigerant circuit 66 via the cooling circuit 76 and evaporator 74. Simultaneously, thermal energy is also transferred from the operator structure 3 to the evaporator 74 via the operator structure cooler 80. This thermal energy is then rejected to the outside air from the refrigerant circuit 66 via the condenser 70 and outside heat exchanger 64, as the three way flow control valve arrangements 84a and 84b are now switched to allow flow of coolant in the heating circuit 78 through the outside heat exchanger 64. Again, the temperature of the hydraulic fluid is maintained within its target temperature range by metering the rate of coolant flow through the hydraulic fluid heat exchanger 52.

Figure 8:
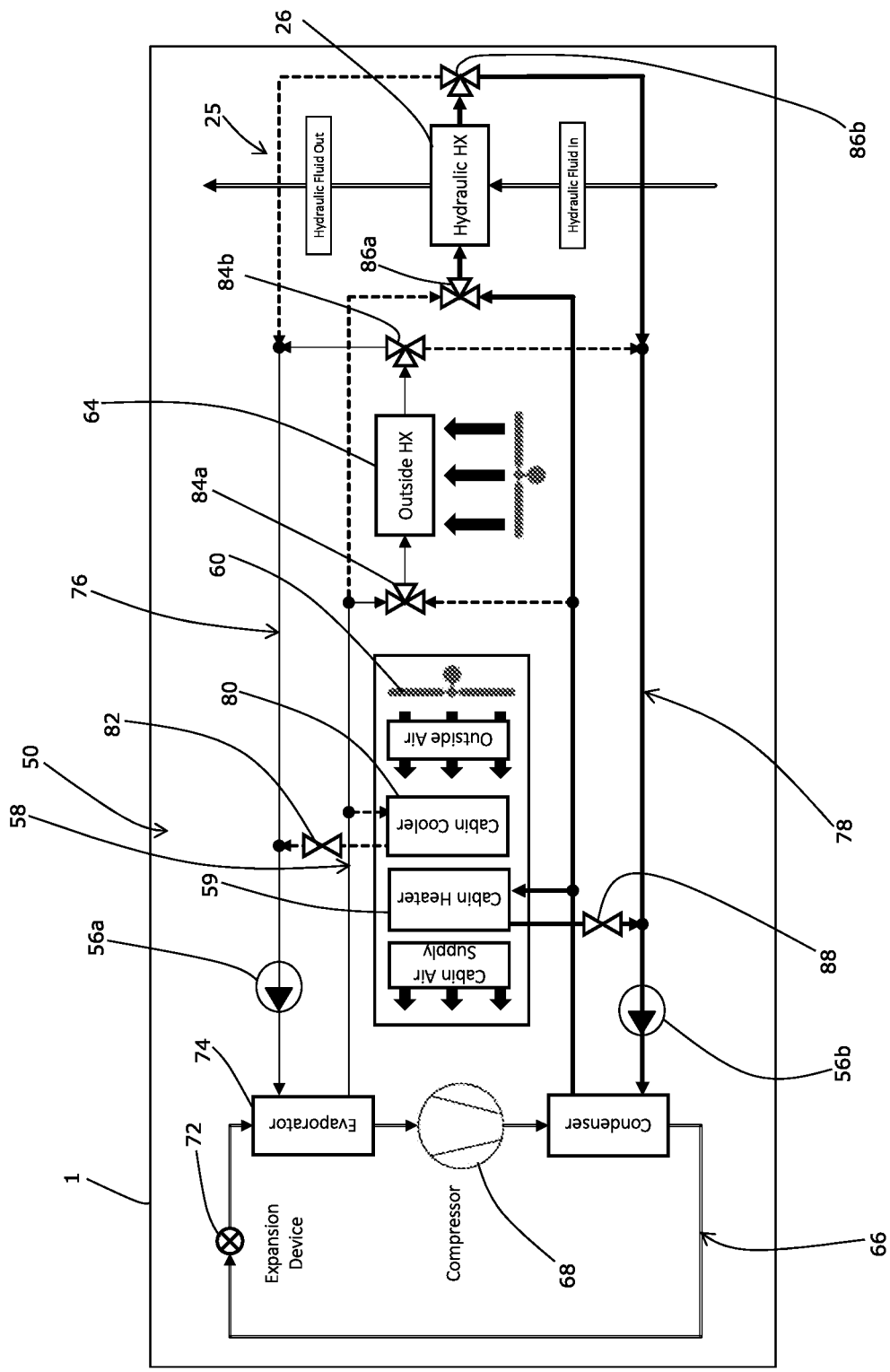

Referring to FIG. 8, the thermal management system 50 is operating in a mode to reflect a situation where, for example, a pre conditioning of the hydraulic fluid and operator structure 3 air temperature is required before operation of the working machine 1, or the working machine 1 has just started operating from a cold start and the operator requires the operator structure 3 to be heated and at the same time the hydraulic fluid in the hydraulic circuit 25 is lower than the target temperature range. Consequently, thermal energy is absorbed by the refrigerant circuit 66 via a heat transfer process that takes thermal energy from the outside air to the cooling circuit 76 via the outside heat exchanger 64 and then into the refrigerant circuit 66 via the evaporator 74.

Alternatively, if there is not enough thermal energy available from the atmosphere to meet the energy requirement of the working machine 1, the thermal management system 50 may absorb thermal energy from any suitable source, for example, from the electric heater, the fuel burning heater, the electric storage device 20 or the electric motor 30.

This thermal energy is then transferred to the hydraulic fluid in the hydraulic fluid circuit 25 and to the operator structure 3 via the refrigerant circuit 66 to the condenser 70 and then into the heating circuit 78 which has its flow control valves set to allow the flow of heated coolant into both the operator structure heat exchanger 58 and the hydraulic fluid heat exchanger 52.

Figure 9:
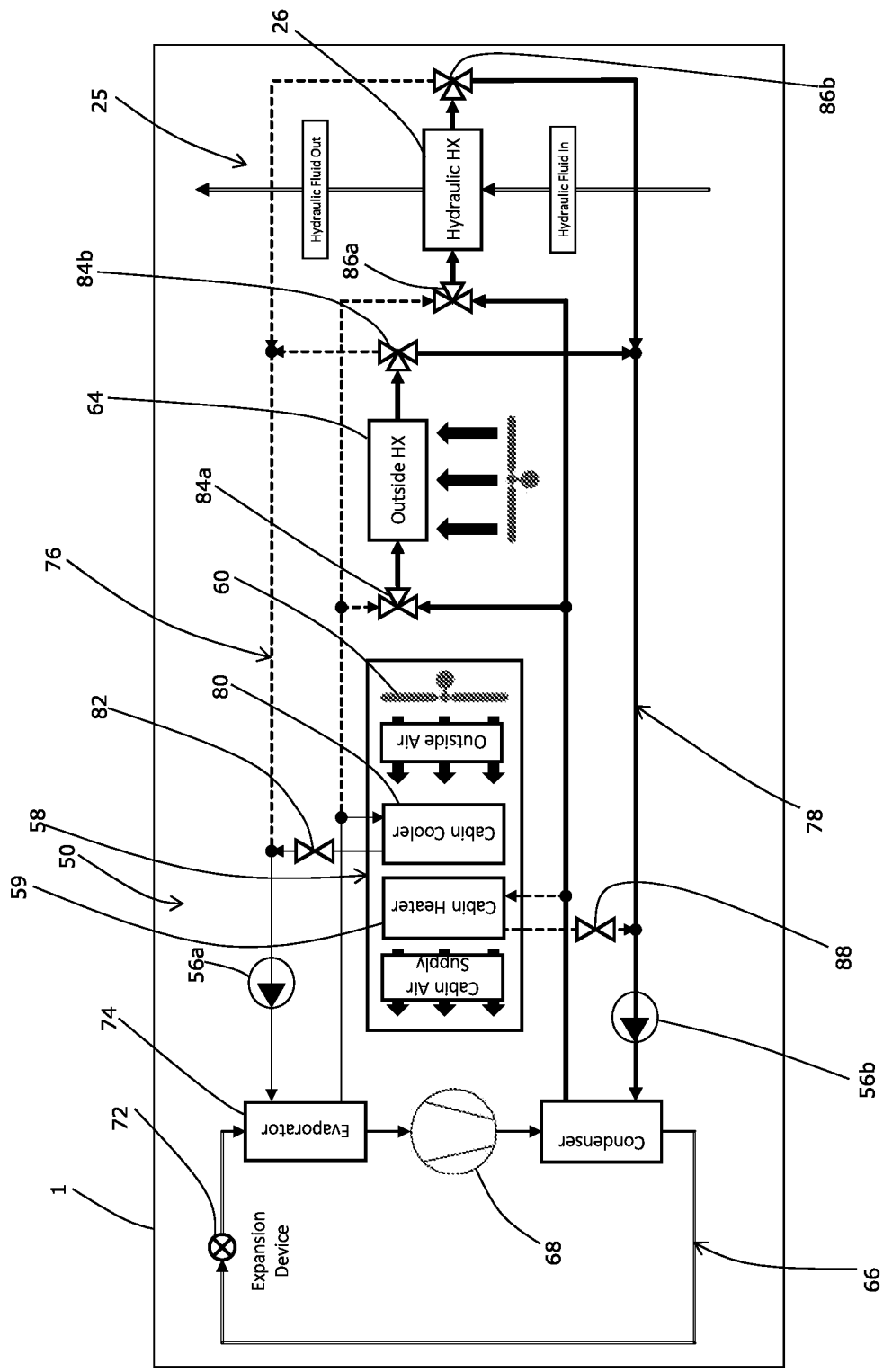

With reference to FIG. 9 the thermal management system 50 is set to reflect a situation where the ambient temperature is relatively warm and the operator has requested cooling within the operator structure 3 and simultaneously the machine 1 is operating on a light duty cycle such that the natural frictional losses due to flow of hydraulic fluid around the hydraulic fluid circuit 25 is not capable of maintaining the temperature of the hydraulic fluid at the desirable temperature range and therefore some heating of the hydraulic fluid is also required.

Accordingly, thermal energy is absorbed by the refrigerant circuit 66 via the operator structure air to the cooling circuit 76 via the operator structure cooler 80 and to the refrigerant circuit 66 via the cooling circuit 76 and evaporator 74. This thermal energy is then rejected to the hydraulic fluid and to the outside air by way of its transfer to the condenser 70 via the refrigerant circuit 66 and from the condenser 70 to the heating circuit 78 and then into both the hydraulic fluid heat exchanger 52 and the outside heat exchanger 64. The rate of flow of heated coolant into the hydraulic fluid heat exchanger may be metered to ensure the temperature of the hydraulic fluid is maintained within the target temperature range, with the remaining flow and excess thermal energy being expelled to the outside air via the outside heat exchanger 64.

It can therefore be appreciated that the thermal management system 50 may be switched via the opening and closing of the flow control valves to efficiently provide and remove thermal energy to the operator structure 3 and or the hydraulic fluid circuit 25 as required and to remove thermal energy from the operator structure 3 and the hydraulic fluid circuit 25 as required, thereby ensuring a pleasant environment for the working machine operator and the hydraulic fluid being utilized within the desirable temperature range for efficient movement of the working arm 6, 7.

The thermal management system 50 may also be adapted to supply or remove thermal energy to the batteries and power electronics by adding the suitable further valves and heat exchangers to the system of FIGS. 6 to 9. It will be appreciated that the thermal management system 50 may be adapted to supply or remove thermal energy to any other machine device requiring active thermal management to function or to improve thermal efficiency of performance by adding suitable additional valves and heat exchangers to the system of FIGS. 6 to 9.

Figure 10:
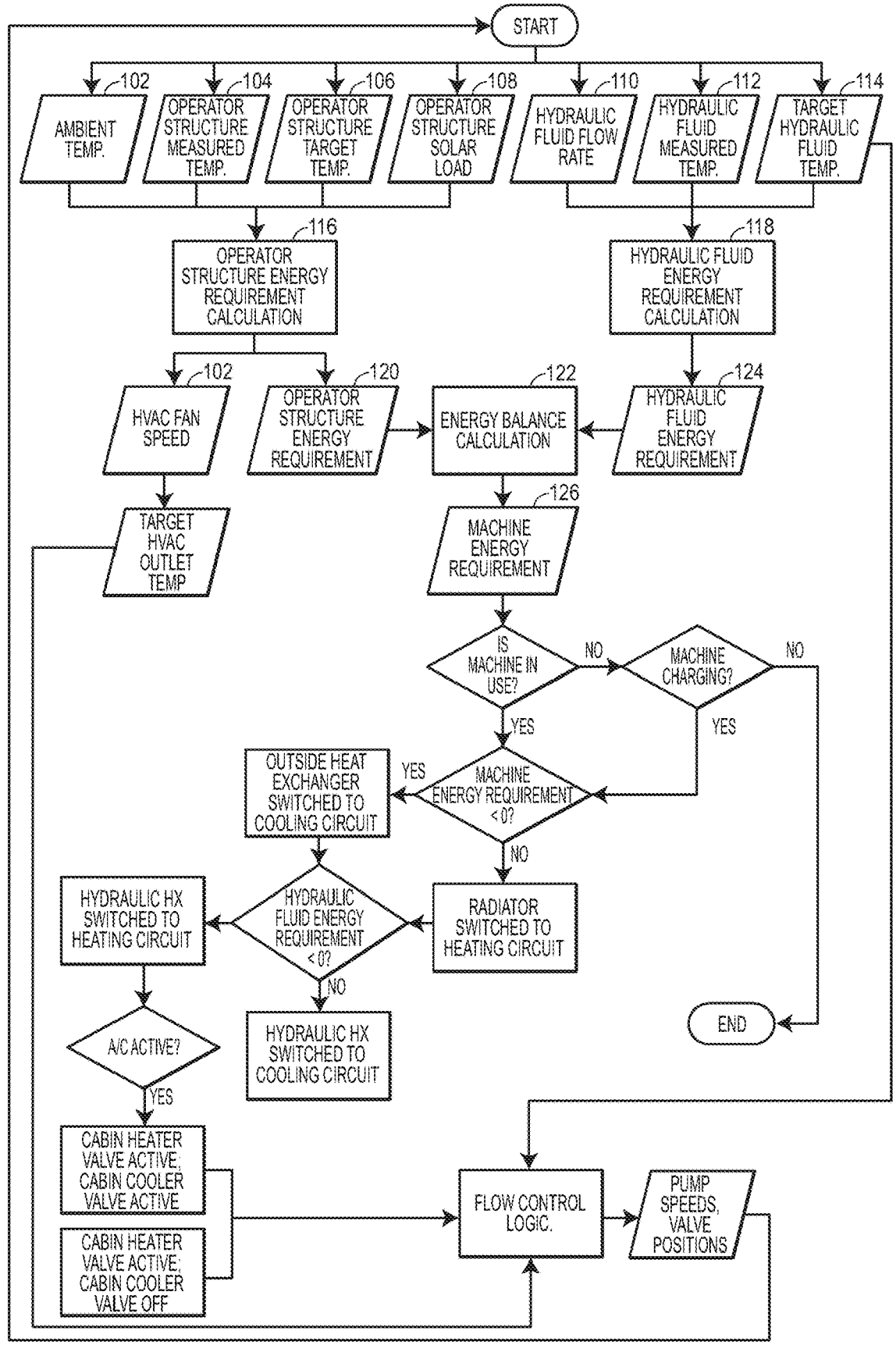
FIG. 10 is a control logic diagram for the thermal management system of FIGS. 6 to 9.

Referring to FIG. 10, the control logic of the thermal management system 50 is illustrated. This process is configured to selectively transfer thermal energy between the hydraulic fluid 26 and the operator structure 3 for preheating and for efficient energy transfer during operation of the working machine 1.

In order to establish whether there is a heating or cooling requirement of the hydraulic fluid 26, the thermal management system 50 carries out a hydraulic fluid energy requirement calculation 118. This calculation 118 determines a hydraulic fluid energy requirement 124 based on a target hydraulic fluid temperature 114. The target hydraulic fluid temperature 114 can be manually inputted into the thermal management system 50 or can be pre-set into the thermal management system 50. The target hydraulic fluid temperature 114 may be inputted as a temperature range with an upper and lower temperature limit. This target hydraulic fluid temperature 114 may be in the range of 40° C. to 60° C., although it will be appreciated that the target temperature may be varied to suit to the working machine 1 and/or the application.

It will be appreciated that, if there is a need to preheat the operator structure 3 to achieve a target operator structure temperature 106, this thermal energy may be supplied by the hydraulic fluid. A target hydraulic fluid temperature 114 may be set below the measured hydraulic fluid temperature 112, and that this target hydraulic fluid temperature 114 may be below the temperature range for optimal working efficiency of the hydraulic fluid. This enables the thermal management system 50 to transfer thermal energy from the hydraulic fluid to the operator structure 3. Thermal energy may then be supplied to the hydraulic fluid from an alternative source.

The working machine 1 may include a device (not shown) for measuring the flow rate of the hydraulic fluid 26 along the hydraulic fluid flow path. The device may be, for example, a flow meter. The determination of the energy requirement 124 of the hydraulic fluid 26 may further incorporate the measured hydraulic fluid flow rate 110. This has been found to increase the accuracy of the energy requirement 124 of the hydraulic fluid 26. The determination of the energy requirement 124 of the hydraulic fluid 26 may incorporate the volume of hydraulic fluid and/or the specific heat capacity of the hydraulic fluid 26. Monitoring of one or more of these factors enables the amount of energy required to heat the hydraulic fluid to a pre-determined temperature and/or the surplus energy contained within the hydraulic fluid.

If the hydraulic fluid energy requirement 124 is less than zero (i.e. if the energy requirement is negative), there is an energy surplus of the hydraulic fluid and the thermal management system 50 will selectively remove thermal energy from the hydraulic fluid 26 via the hydraulic fluid heat exchanger 52. Put another way, if the measured temperature 112 of the hydraulic fluid is greater than the target hydraulic fluid temperature 114, there is an energy surplus of the hydraulic fluid, and the thermal management system 50 will selectively remove thermal energy from the hydraulic fluid 26 via the hydraulic fluid heat exchanger 52.

If the hydraulic fluid energy requirement 124 is more than zero (i.e. if the energy requirement is positive), there is an energy deficit of the hydraulic fluid and the thermal management system 50 will selectively input thermal energy into the hydraulic fluid 26 via the hydraulic fluid heat exchanger 52. Put another way, if the measured temperature 112 of the hydraulic fluid is less than the target hydraulic fluid temperature 114, there is an energy deficit of the hydraulic fluid and the thermal management system 50 will selectively add thermal energy to the hydraulic fluid 26 via the hydraulic fluid heat exchanger 52.

In order to establish whether there is a heating or cooling requirement of the operator structure 3, the thermal management system 50 carries out an operator structure energy requirement calculation 116. This calculation 116 determines an operator structure energy requirement 120 based on the target operator structure temperature 106. The target operator structure temperature 106 can be manually inputted into the thermal management system 50 or can be pre-set into the thermal management system 50.

The working machine 1 may include a sensor (not shown) for measuring an ambient temperature 102 surrounding the working machine 1. The working machine 1 may include a sensor (not shown) for measuring the solar load 108 on the operator structure 3. The determination of the energy requirement 120 of the operator structure 3 may further include the measured ambient temperature 102 and/or the measured solar load 108. This has been found to increase the accuracy of the energy requirement 120 of the operator structure 3.

If the operator structure energy requirement 120 is less than zero (i.e. the energy requirement is negative), there is an energy surplus of the operator structure 3 and the thermal management system 50 will selectively remove thermal energy from the operator structure 3 via the climate control assembly 36. Put another way, if the measured temperature 104 of the operator structure 3 is greater than the target operator structure 106, there is an energy surplus of the operator structure 3 and the thermal management system 50 will selectively remove thermal energy from the operator structure 3 via the climate control assembly 36.

If the operator structure energy requirement 120 is more than zero (i.e. if the energy requirement is positive), there is an energy deficit of the operator structure 3 and the thermal management system 50 will selectively input thermal energy into the operator structure 3 via the climate control assembly 36. Put another way, if the measured temperature 104 of the operator structure 3 is less than the target operator structure temperature 106, there is an energy deficit of the operator structure 3 and the thermal management system 50 will selectively add thermal energy from the operator structure 3 via the climate control assembly 36.

If the thermal management system 50 determines that there is an operator structure energy surplus and a hydraulic fluid energy deficit, the thermal management system 50 is configured to selectively transfer thermal energy from the operator structure 3 to the hydraulic fluid 26. Alternatively, if the thermal management system 50 determines that there is an operator structure energy deficit and a hydraulic fluid energy surplus, the thermal management system is configured to transfer thermal energy from the hydraulic fluid 26 to the operator structure 3.

The thermal management system 50 is configured to perform an energy balance calculation 122 in order to determine the energy requirement 126 of the working machine 1. The energy balance calculation 122 is based on the energy requirement 124 of the hydraulic fluid 26, the energy requirement 120 of the operator structure 3 and the work done by components of the energy distribution system.

As has been discussed above, the working machine 1 includes an energy distribution system to selectively transfer thermal energy between the operator structure 3 and the hydraulic fluid 26. As has been discussed above, in some embodiments, the energy distribution system 50 may incorporate a means of energy transfer which, when operated, results in additional energy being added to the energy distribution system. An example of this may be in the form of a vapor compression refrigerant circuit (as is discussed with reference to FIGS. 6 to 9 below). The work carried out on refrigerant within the refrigerant circuit by the compressor 68 further increases the energy content of said refrigerant, and the determination of the energy requirement 126 of the working machine 1 may incorporate the energy inputted by the energy distribution system itself. Incorporation of the energy inputted by the energy distribution system of FIGS. 6 to 9 into the energy requirement 126 of the working machine 1 has been found to improve the accuracy of the energy balance calculation 122.

If the value energy requirement 126 of the working machine 1 is less than zero (i.e. where the energy requirement 126 is negative), there is a surplus of energy of the working machine 1. For example, if both the operator structure 3 and the hydraulic fluid 26 have temperatures above their respective temperatures and so each have an energy surplus, or if an energy deficit of either the operator structure 3 or hydraulic fluid 26 is smaller than the energy surplus of the other added to the energy inputted into the energy distribution system by the refrigerant compressor 68. Where it is determined that the working machine 1 has an energy surplus, the thermal management system 50 is configured to selectively remove thermal energy from the working machine 1 (e.g. from the operator structure 3 and/or the hydraulic fluid).

If the energy requirement 126 of the working machine 1 is more than zero (i.e. where the energy requirement 126 is positive), there is an energy deficit of the working machine 1.

For example, if both the operator structure 3 and the hydraulic fluid 26 have temperatures below their respective target temperatures and so each have an energy deficit that is greater than any energy inputted into the energy distribution system by the refrigerant compressor 68, or if an energy deficit of either the operator structure 3 or hydraulic fluid 26 is greater than the energy surplus of the other added to the energy inputted into the energy distribution system by the refrigerant compressor 68. Where it is determined that the working machine 1 has an energy deficit the thermal management system 50 is configured to selectively input thermal energy into the operator structure 3 and/or the hydraulic fluid.

Determining the energy requirements of the operator structure 3, hydraulic fluid 26 and the energy inputted into the energy distribution system as a part of the calculation of the energy requirement 126 of the working machine 1 enables the thermal management system 50 to determine the local energy requirements as well as for the overall working machine 1. This, in turn, enables the thermal management system 50 to selectively remove thermal energy from a first location/component having an energy surplus, and to supply said surplus energy to a second location/component having an energy deficit. This arrangement has been found to increase the efficiency of the thermal management system 50, by facilitating heat transfer around the working machine 1 prior to thermal energy being added/removed from the working machine 1. The thermal management system 50 may be configured to prioritize the removal/inputting of thermal energy to systems of the working machine 1 which need protection from overheating/cooling to a damaging level.

In order to further aid the removal of thermal energy from the hydraulic fluid 26 in the event of an energy surplus, the thermal management system 50 may further comprise a hydraulic fluid in-line cooler and/or an electric fan. Additionally, the thermal management system 50 may employ system de-rate, where the working machine 1 is operated at less than its rated maximum capability, to slow down the generation of thermal energy.

The working machine 1 includes an electric heater (not shown) for supplying thermal energy to the thermal management system 50. If the working machine 1 is in an active state, electric power is supplied to the electric heater from mains electricity (if the working machine is charging) or from the electric storage unit 20 (if the working machine is turned on). The addition of an electric heater enables a quick supply of thermal energy if there is none readily available from an alternative heat source, as discussed in more detail below.

The thermal energy inputted into the working machine 1 by the thermal management system 50 may be absorbed from any suitable source of thermal energy, for example, from the electric heater, a fuel burning heater the electric storage device 20 or the electric motor 30. Through the determination of the energy requirement 126 of the working machine 1, the thermal management system 50 is able to determine the amount of thermal energy that needs to be absorbed from the alternative energy sources for the heating of the operator structure 3 and/or the hydraulic fluid 26.

As is discussed above, the working machine 1 includes an outside heat exchanger assembly 38. The outside heat exchanger assembly 38 includes an outside heat exchanger 64. In some embodiments, the outside heat exchanger 64 is a radiator. The outside heat exchanger 64 is configured to liberate thermal energy from the atmosphere and to supply thermal energy to the thermal management system if there is an energy deficit of the thermal management system 50. Additionally, in the case of an energy surplus, the outside heat exchanger 64 is configured to reject surplus thermal energy from the thermal management system 50 to the atmosphere.

Where it is determined that the working machine 1 has an energy surplus, the thermal management system 50 is configured to selectively reject thermal energy from the working machine 1 to the atmosphere. Where it is determined that the working machine 1 has an energy deficit, the thermal management system 50 is configured to selectively absorb thermal energy from the atmosphere. It will be appreciated that the thermal management system 50 may be configured to absorb/receive energy from several heat sources, for example other components of the working machine 1 such as the electric heater, the electric storage device 20, the hydraulic pump electric motor 30, electric motor M for providing, at least in part, tractive power to the working machine 1 or any suitable component of the working machine 1.

Alternatively, the thermal management system 50 may be configured to reject thermal energy to several heat sinks, for example other components of the working machine 1 such as the electric storage device 20, the hydraulic pump electric motor 30, electric motor M for providing, at least in part, tractive power to the working machine 1 or any suitable component of the working machine 1. The thermal management 50 may be configured to include the amount of thermal energy rejected to/absorbed from these alternative heat sinks/sources in the energy balance calculation 122. This may improve the accuracy of the machine energy requirement 126 and help to inhibit the inefficient rejection/absorption of thermal energy.

The thermal management system 50 of the working machine 1 may also include a control system (not shown) that is configured to monitor the time at which the working machine 1 is turned on. The control system may include a machine learning algorithm so to be further configured such that it is establishes an expected start time for operation of the working machine 1. In such arrangements, the thermal management system 50 may then be configured to the control logic illustrated in FIG. 10 (i.e. the preheating process) so as to achieve the target temperature of the hydraulic fluid 26 and/or the operator structure 3 at the time at which the working machine 1 is expected to be turned on. This has been found to improve the efficiency of the working machine 1, by preventing thermal energy being used to maintain the hydraulic fluid 26 and the operator structure 3 at their target temperatures 114, 106 for long periods of time where the working machine 1 is not being operated (e.g. overnight).

The invention claimed is:

1. A working machine comprising:
   a hydraulic fluid circuit arranged to provide hydraulic fluid to one or more hydraulic actuators to perform a working operation;
   an operator structure;
   an operator structure climate control assembly comprising an operator structure heat exchanger, wherein the operator structure heat exchanger comprises an operator structure heater arranged to selectively add thermal energy to the operator structure for selectively warming the operator structure, and an operator structure cooler arranged to selectively remove thermal energy from the operator structure for selectively cooling the operator structure;
   a hydraulic fluid heat exchanger arranged to selectively add and/or remove thermal energy from the hydraulic fluid circuit for selectively warming and cooling the hydraulic fluid; and
   a thermal management system connecting the hydraulic fluid heat exchanger to the operator structure heater to selectively supply thermal energy to the operator structure heater and to the operator structure cooler to selectively remove thermal energy from the operator structure cooler,
   wherein the thermal management system comprises a processor configured to execute a control logic to determine an operator structure energy requirement based on a target operator structure temperature and a hydraulic fluid energy requirement based on a target hydraulic fluid temperature,
   wherein the thermal management system comprises an energy distribution system comprising a coolant circuit having a coolant flow path in thermal communication with the operator structure cooler and the hydraulic fluid heat exchanger for transferring thermal energy between the operator structure and the hydraulic fluid, and wherein the energy distribution system is configured to selectively transfer thermal energy between the operator structure and the hydraulic fluid based on the relative values of the operator structure energy requirement and the hydraulic fluid energy requirement.

2. The working machine of claim 1, wherein the energy distribution system of the thermal management system is configured to activate when the working machine is charging.

3. The working machine of claim 1, wherein the thermal management system is configured to heat the hydraulic fluid and/or the operator structure to the respective target temperature(s) prior to or at an expected time of operation of the working machine.

4. The working machine of claim 3, wherein the expected time of operation is input by an operator, or wherein the thermal management system is configured to calculate the expected time of operation of the working machine from a mean of times at which the working machine is turned on over a pre-determined period of time.

5. The working machine of claim 3, wherein the thermal management system is configured to activate such that the time at which the hydraulic fluid and/or the operator structure are preheated to their respective target temperatures is approximately equal to the expected time of operation.

6. The working machine of claim 1, wherein the thermal management system is configured to determine whether the working machine has an energy surplus or an energy deficit based on the operator structure energy requirement and the hydraulic fluid energy requirement.

7. The working machine of claim 1, wherein the energy distribution system is configured to impart thermal energy into the thermal management system when transferring thermal energy between the operator structure and the hydraulic fluid, and wherein the thermal management system is configured to transfer the imparted energy to the hydraulic fluid and/or operator structure.

8. The working machine of claim 1, wherein, when the working machine is determined to have a thermal energy surplus, the thermal management system is configured to selectively remove thermal energy from the hydraulic fluid and/or the operator structure and to direct the surplus thermal energy to ambient or to transfer the surplus thermal energy to a component of the working machine.

9. The working machine of claim 1, wherein the energy distribution system comprises a heat pump circuit comprising a compressor for compressing a refrigerant in the heat pump circuit.

10. The working machine of claim 1, wherein the thermal management system is configured to determine whether the working machine has an energy surplus or an energy deficit based on thermal energy in a coolant within the coolant circuit.

11. The working machine of claim 1, comprising an electric heater arranged to supply thermal energy to the thermal management system.

12. The working machine of claim 11, wherein the thermal management system is configured to pre-heat the hydraulic fluid and/or operator structure using the thermal energy supplied by the electric heater.

13. The working machine of claim 1, wherein the thermal management system is configured to determine the operator structure energy requirement and/or hydraulic fluid energy requirement based on a measured ambient temperature.

14. The working machine of claim 1, wherein the thermal management system is configured to determine the operator structure energy requirement based on a solar load imparted onto the operator structure.

15. The working machine of claim 1, wherein the hydraulic fluid energy requirement is based on a volume of hydraulic fluid in the hydraulic circuit and/or wherein the hydraulic fluid energy requirement is based on a specific heat capacity of the hydraulic fluid and/or wherein the hydraulic fluid energy requirement is based on a flow rate of hydraulic fluid along the hydraulic circuit.

16. A working machine comprising:
a hydraulic fluid circuit arranged to provide hydraulic fluid to one or more hydraulic actuators to perform a working operation;
an operator structure;
an operator structure climate control assembly comprising an operator structure heat exchanger, wherein the operator structure heat exchanger comprises an operator structure heater arranged to selectively add thermal energy to/from the operator structure for selectively warming the operator structure and an operator structure cooler arranged to selectively remove thermal energy from the operator structure for selectively cooling the operator structure;
a hydraulic fluid heat exchanger arranged to selectively add and remove thermal energy from the hydraulic fluid circuit for selectively warming and cooling the hydraulic fluid; and
a thermal management system connecting the hydraulic fluid heat exchanger to the operator structure heater to selectively supply thermal energy to the operator structure heater and to the operator structure cooler to selectively remove thermal energy from the operator structure cooler,
wherein the thermal management system comprises an energy distribution system comprising a coolant circuit having a coolant flow path in thermal communication with the operator structure cooler and the hydraulic fluid heat exchanger for transferring thermal energy between the operator structure and the hydraulic fluid, and
wherein the energy distribution system is configured to selectively transfer thermal energy from the operator structure to the hydraulic fluid or from the hydraulic fluid to the operator structure based on the respective temperatures of the operator structure and the hydraulic fluid, and
wherein the thermal management system is configured to preheat the hydraulic fluid prior to operation of the working machine to overheat the hydraulic fluid to store thermal energy for heating the operator structure.

17. The working machine of claim 16, wherein the energy distribution system of the thermal management system is configured to activate when the working machine is charging.

* * * * *